(12) United States Patent
Shima et al.

(10) Patent No.: US 6,751,697 B1
(45) Date of Patent: *Jun. 15, 2004

(54) METHOD AND SYSTEM FOR A MULTI-PHASE NET REFRESH ON A BUS BRIDGE INTERCONNECT

(75) Inventors: Hisato Shima, Sunnyvale, CA (US); Bruce A. Fairman, Woodside, CA (US); David Vernon James, Palo Alto, CA (US); Scott Smyers, San Jose, CA (US); Glen David Stone, Los Gatos, CA (US); Kazonubu Toguchi, White Plains, NY (US); Richard K. Scheel, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 105 days.

This patent is subject to a terminal disclaimer.

(21) Appl. No.: 09/724,201

(22) Filed: Nov. 27, 2000

Related U.S. Application Data
(60) Provisional application No. 60/167,958, filed on Nov. 29, 1999.

(51) Int. Cl.[7] .............................................. G06F 13/36
(52) U.S. Cl. ...................... 710/306; 710/104; 710/107; 710/500; 710/311; 710/312; 710/315; 710/100
(58) Field of Search ................................. 710/300, 311, 710/312, 315, 306, 100, 104, 107, 8, 40; 709/216, 224, 220; 713/400; 370/257

(56) References Cited

U.S. PATENT DOCUMENTS

| | | | |
|---|---|---|---|
| 5,394,556 A | * 2/1995 | Oprescu ..................... | 709/220 |
| 5,511,165 A | * 4/1996 | Brady et al. ................ | 709/216 |
| 5,563,886 A | * 10/1996 | Kawamura et al. ......... | 370/257 |
| 5,579,486 A | * 11/1996 | Oprescu et al. ............ | 710/107 |
| 5,630,173 A | * 5/1997 | Oprescu ...................... | 710/40 |
| 5,684,959 A | 11/1997 | Bhat et al. | |
| 5,717,853 A | 2/1998 | Deshpande et al. | |
| 5,774,683 A | * 6/1998 | Gulick ........................ | 710/315 |
| 5,828,899 A | * 10/1998 | Richard et al. ............... | 710/8 |
| 5,875,301 A | * 2/1999 | Duckwall et al. ............. | 710/8 |
| 5,883,621 A | * 3/1999 | Iwamura ..................... | 725/37 |
| 5,910,178 A | * 6/1999 | Moh et al. .................. | 709/232 |
| 5,923,673 A | * 7/1999 | Henrikson .................. | 714/712 |
| 5,935,208 A | 8/1999 | Duckwall et al. ........... | 709/221 |
| 5,961,623 A | * 10/1999 | James et al. ................ | 710/113 |
| 5,982,783 A | * 11/1999 | Frey et al. ................ | 370/395.6 |
| 6,032,261 A | * 2/2000 | Hulyalkar ................... | 713/400 |
| 6,131,119 A | * 10/2000 | Fukui ......................... | 709/224 |
| 6,157,972 A | 12/2000 | Newman et al. ........... | 710/100 |
| 6,191,822 B1 | * 2/2001 | Smyers ....................... | 348/552 |
| 6,199,119 B1 | 3/2001 | Duckwall et al. ............. | 710/8 |
| 6,282,205 B1 | * 8/2001 | Lu ............................. | 370/465 |
| 6,286,067 B1 | * 9/2001 | James et al. ................ | 710/104 |
| 6,374,316 B1 | * 4/2002 | James et al. ................ | 710/104 |
| 6,378,000 B1 | * 4/2002 | Akatsu et al. .............. | 709/245 |
| 6,389,547 B1 | * 5/2002 | James et al. ................ | 713/400 |
| 6,501,389 B1 | * 12/2002 | Aguirre ................. | 340/825.25 |
| 6,502,158 B1 | * 12/2002 | James et al. ................ | 710/311 |
| 6,539,450 B1 | * 3/2003 | James et al. ................ | 710/306 |
| 6,584,539 B1 | * 6/2003 | James et al. ................ | 710/344 |
| 6,647,446 B1 | * 11/2003 | James et al. ................ | 710/100 |

* cited by examiner

*Primary Examiner*—Xuan M. Thai
*Assistant Examiner*—Justin King
(74) *Attorney, Agent, or Firm*—Blakely, Sokoloff, Taylor & Zafman LLP

(57) ABSTRACT

A method and system for a multi-phase net refresh on a bus bridge interconnect, the interconnect comprising a number of nodes, a bus bridge, and a number of buses, are described. In one embodiment, a primary bus is acquired by communicating with other bus bridges on the buses. A secondary bus is breached to acquire the secondary bus. In addition, the primary bus and the secondary bus are committed.

43 Claims, 20 Drawing Sheets

METHOD AND SYSTEM FOR A MULTI-PHASE NET REFRESH ON A BUS BRIDGE INTERCONNECT

This application claims benefit of U.S. Provisional Application No. 60/167,958 filed Nov. 29, 1999.

FIELD OF THE INVENTION

The present invention relates generally to audio, video, and audio/video interconnected systems for home and office use. In particular, the present invention relates to a multi-phase reset on a bus bridge interconnect.

BACKGROUND OF THE INVENTION

With the development of consumer electronic audio/video (A/V) equipment, and the advance of digital A/V applications, such as consumer A/V device control and signal routing and home networking, various types of data in various formats can now be transferred among several audio/video control (AV/C) devices via one digital bus system. However, many current systems do not have sufficient bandwidth resources to transfer and display all the different types of data at the same time.

Typical computer systems solve the bandwidth problem by increasing the bandwidth of the system bus to handle all of these forms, types and amount of data. As a result, as users request more types of information, such as in multimedia applications, the system bus has become more clogged with information other than information directly utilized and needed by the main processor.

Many computer systems incorporate at least two buses. A first bus, commonly referred to as a memory bus, is typically used for communications between a central processor and a main memory. A second bus, known as a peripheral bus, is used for communications between peripheral devices such as graphics systems, disk drives, or local area networks. To allow data transfers between these two buses, a bus bridge is utilized to "bridge", and thereby couple, the two buses together.

One example of a high-speed bus system for interconnecting A/V nodes, configured as a digital interface used to transport commands and data among interconnecting audio/video control (AV/C) devices, is the IEEE 1394 standard serial bus implemented by IEEE Std 1394-1995, *Standard For A High Performance Serial Bus*, Aug. 30, 1996 (hereinafter "IEEE 1394 standard") and other related 1394 standards.

The IEEE 1394 standard is an international standard for implementing a high-speed serial bus architecture, which supports both asynchronous and isochronous format data transfers. The IEEE 1394 standard defines a bus as a non-cyclic interconnect, consisting of bus bridges and nodes. Within a non-cyclic interconnect, devices may not be connected together so as to create loops. Within the non-cyclic interconnect, each node contains an AV/C device, and bus bridges serve to connect buses of similar or different types.

The primary task of a bridge is to allow data to be transferred on each bus independently without demonstrating performance of the bus, except when traffic crosses the bus bridge to reach the desired destination on the other bus. To perform this function, the bridge is configured to understand and participate in the bus protocol of each of the buses.

Multi-bus systems are known to adequately handle large amounts of information. However, communication between buses and devices on different buses is difficult. Typically, a bus bridge may be used to interface I/O buses to the system's high-performance processor/memory bus. With such I/O bridges, the CPU may use a 4-byte read and write transaction to initiate DMA transfers. When activated, the DMA of a serial bus node generates split-response read and write transactions which are forwarded to an intermediate system backbone bus that also implements serial bus services.

Depending on the host system design, the host-adapter bridge may have additional features mandated by differences in bus protocols. For example, the host bus may not directly support isochronous data transfers. Also, the host-adapter bridge may enforce security by checking and translating bridge-bound transaction addresses and may often convert uncached I/O transactions into cache-coherent host-bus transaction sequences.

Each time a new device or node is connected or disconnected from an IEEE 1394 standard serial bus, the entire bus is reset and its topology is reconfigured. The IEEE 1394 standard device configuration occurs locally on the bus without the intervention of a host processor. In the reset process, three primary procedures are typically performed: bus initialization, tree identification, and self identification. Within the IEEE 1394 standard, a single node must first be established as the root node during the tree identification process in order for the reconfiguration to occur.

SUMMARY OF THE INVENTION

A method and system for a multi-phase net refresh on a bus bridge interconnect, the interconnect comprising a number of nodes, a bus bridge, and a number of buses, are described. In one embodiment, a primary bus is acquired by communicating with other bus bridges on the buses. A secondary bus is breached to acquire the secondary bus. In addition, the primary bus and the secondary bus are committed.

BRIEF DESCRIPTION OF THE DRAWINGS

Features and advantages of the present invention will be apparent to one skilled in the art in light of the following detailed description in which.

DETAILED DESCRIPTION

A method and system for a multi-phase net refresh on a bus bridge interconnect, the interconnect comprising a number of nodes, a bus bridge, and a number of buses, are described. In one embodiment, a primary bus is acquired by communicating with other bus bridges on the buses. A secondary bus is breached to acquire the secondary bus. In addition, the primary bus and the secondary bus are committed.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
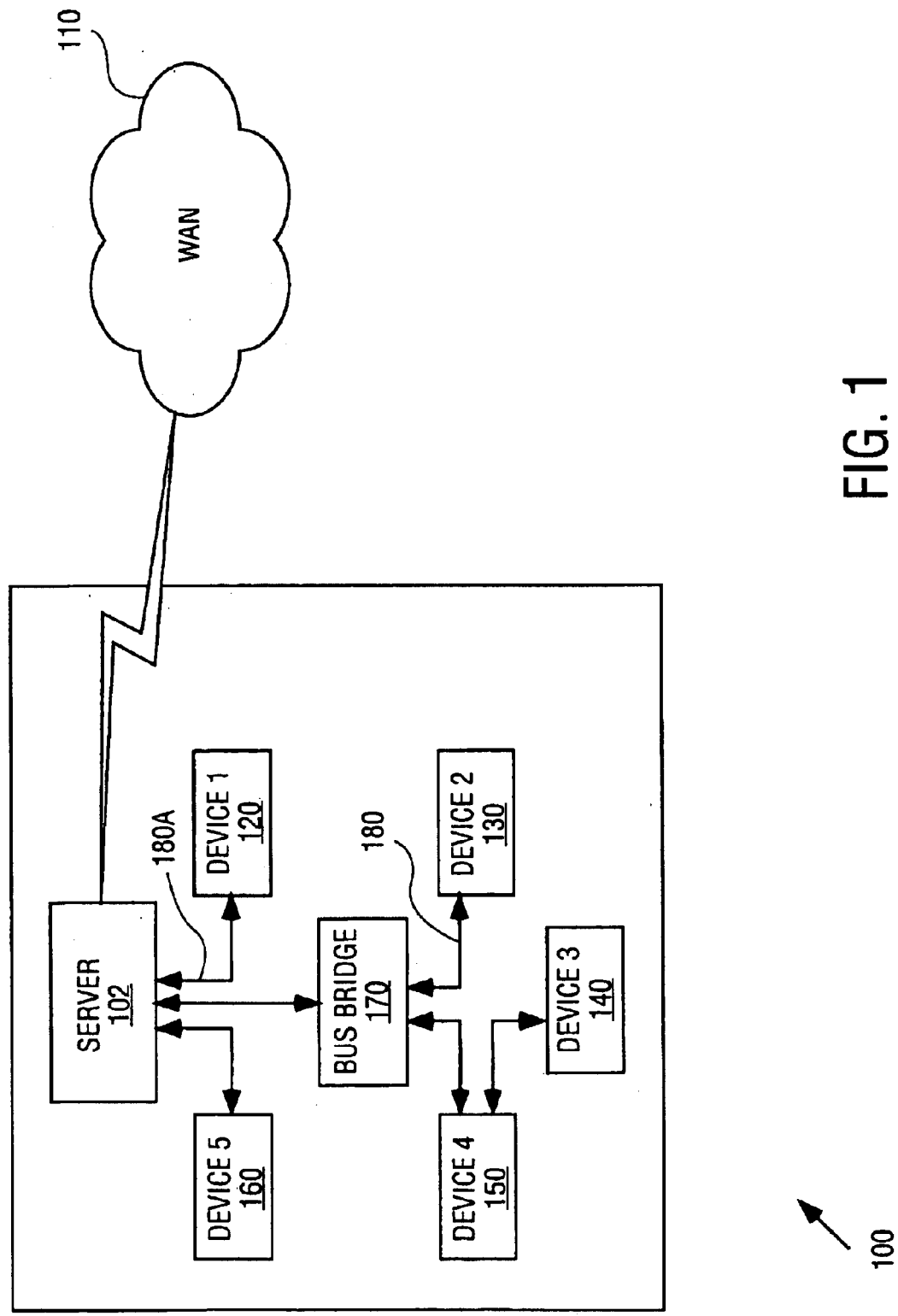
FIG. 1 is a block diagram of one embodiment for an interconnect topology.

FIG. 1 is a block diagram of one embodiment for an interconnect topology 100. Referring to FIG. 1, server 102 is connected to a wide area network (WAN) 110 and to a bus bridge 170. The bus bridge is interconnected to a number of audio, video, and/or audio/video devices, 120, 130, 140, 150, and 160. In one embodiment, the devices (120–160) are connected to bus bridge 170 via the IEEE 1394 standard serial bus. Server 102 may be any device that is capable of connection to both a bus bridge 170 and wide area network 110, such as, for example, a personal computer or a set-top box. In one embodiment, network 110 may be a wide area network, such as, for example, the Internet, or a proprietary network such as America Online®, Compuserve®, Microsoft Network®, or Prodigy®. In addition, WAN 110 may be a television communications network. Server 102 includes a network interface which communicates with WAN 110.

Topology 100 includes high speed serial bus 180 a and 180. In one embodiment, serial bus 180 is the IEEE 1394 standard serial bus. Topology 100 includes various consumer electronic devices 120–160 connected via the high speed serial bus 180 to bus bridge 170. The consumer electronic devices 120–160 may include, for example, a printer, additional monitor, a video camcorder, an electronic still camera, a video cassette recorder, digital speakers, a personal computer, an audio actuator, a video actuator, or any other consumer electronic device that includes a serial interface which complies with a serial interface standard for networking consumer electronic devices—for example, the IEEE 1394 standard. Topology 100 may be contained within a home or office. Bus bridge 170 is used to connect devices 120–160 in which devices 120–160 may be physically located within different rooms of the home or office. Although the original IEEE bus standard is designed for use with a cable interconnect, any communication media may be used such as radio frequency (RF) communication or the like.

Figure 2:
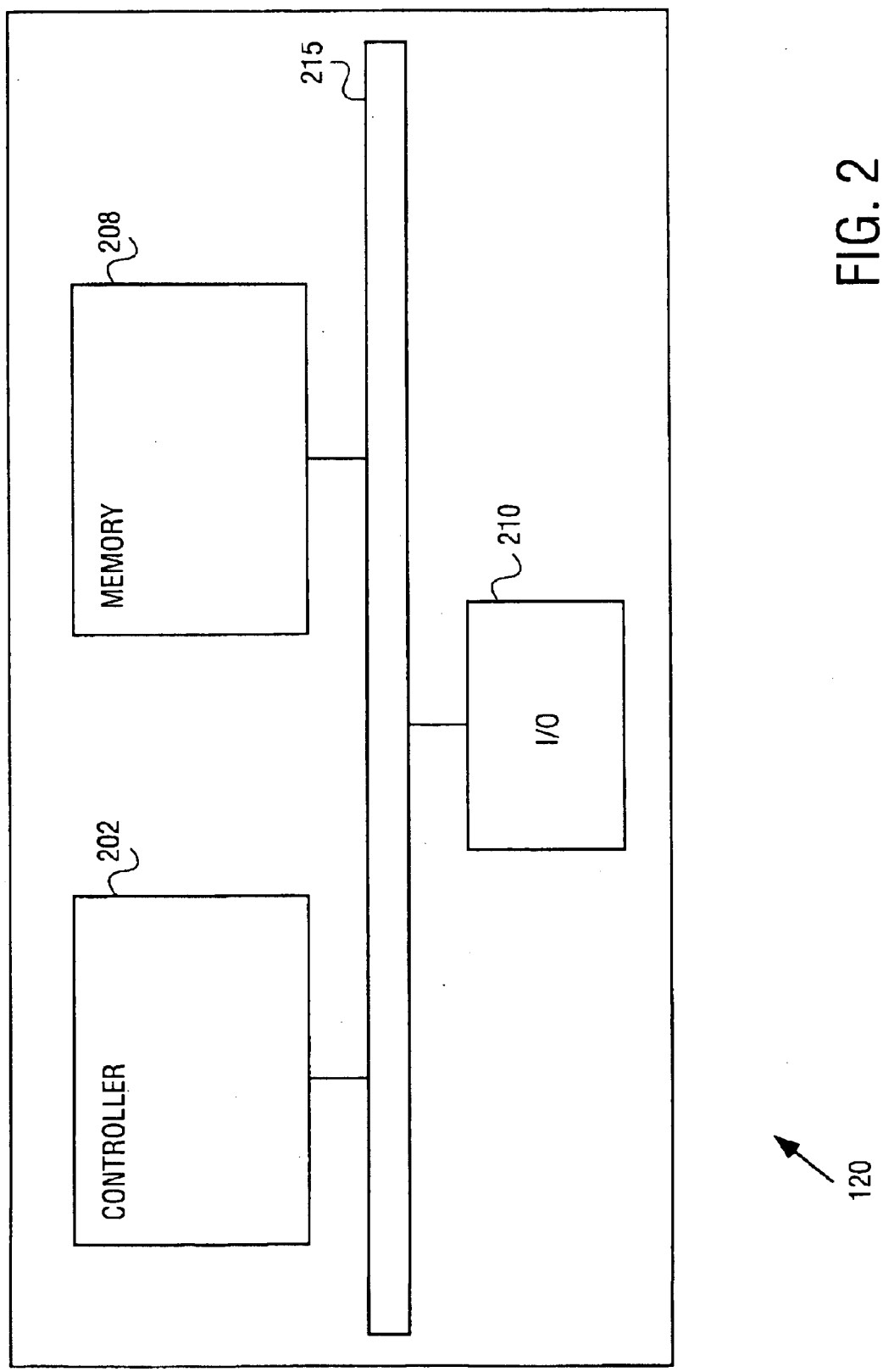
FIG. 2 is a block diagram of a device of FIG. 1.

FIG. 2 is a block diagram of a device 120. Referring to FIG. 2, device 120 may be a laser printer, digital camera, set-top box, or any other appropriate consumer electronic device capable of being connected via a high speed serial bus 180. In one embodiment, the device 120 includes a controller 202, memory 208, and I/O 210, all connected via bus 215. Memory 208 may include, for example, read only memory (ROM), random access memory (RAM), and/or non-volatile memory. I/O 210 provides connection with wide area network 110, bus bridge 170, and another peripheral device (130–160).

In one embodiment, I/O 210 is a serial bus interface that complies with a serial interface standard for networking with consumer electronic devices (120–161) and bus bridge 170 within topology 100. For example, the serial bus interface and topology 100 may use the IEEE 1394 standard serial bus. I/O 210 provides for receiving signals from and transmitting signals to other consumer electronic devices (130–160) or bus bridge 170.

Memory 208 provides temporary storage for voice and data signal transfers between outside network 110 and topology 100. In addition, memory 208 may buffer digital voice and data signals received by I/O 210 from WAN 110 before signals are transmitted onto IEEE 1394 standard bus 180.

Controller 202 controls various operations of device 120. Controller 202 monitors and controls the traffic through the device 120 to and from topology 100 and WAN 110.

Device 120 I/O 210 may have one or more physical ports. A single port device discontinues the bus along the given branch of the bus, whereas devices with two or more ports allow continuation of the bus. Devices with multiple ports permit a daisy chained bus topology, even though the signaling environment is point-to-point. That is, when a multi-port node receives a packet of data, the data is detached and retransmitted to the necessary port as indicated within the data. The configuration is performed dynamically as new devices are attached and/or removed from bus 180.

The 1394 standard bus protocol is designed to support peer-to-peer transfers between devices. This allows serial bus devices to transfer data between themselves without intervention from a computer system or host system. This allows high throughput between devices without affecting the performance of the computer system. Thus, a video camera may be set up to transfer between itself and a video cassette recorder without accessing a computer system.

Figure 3:
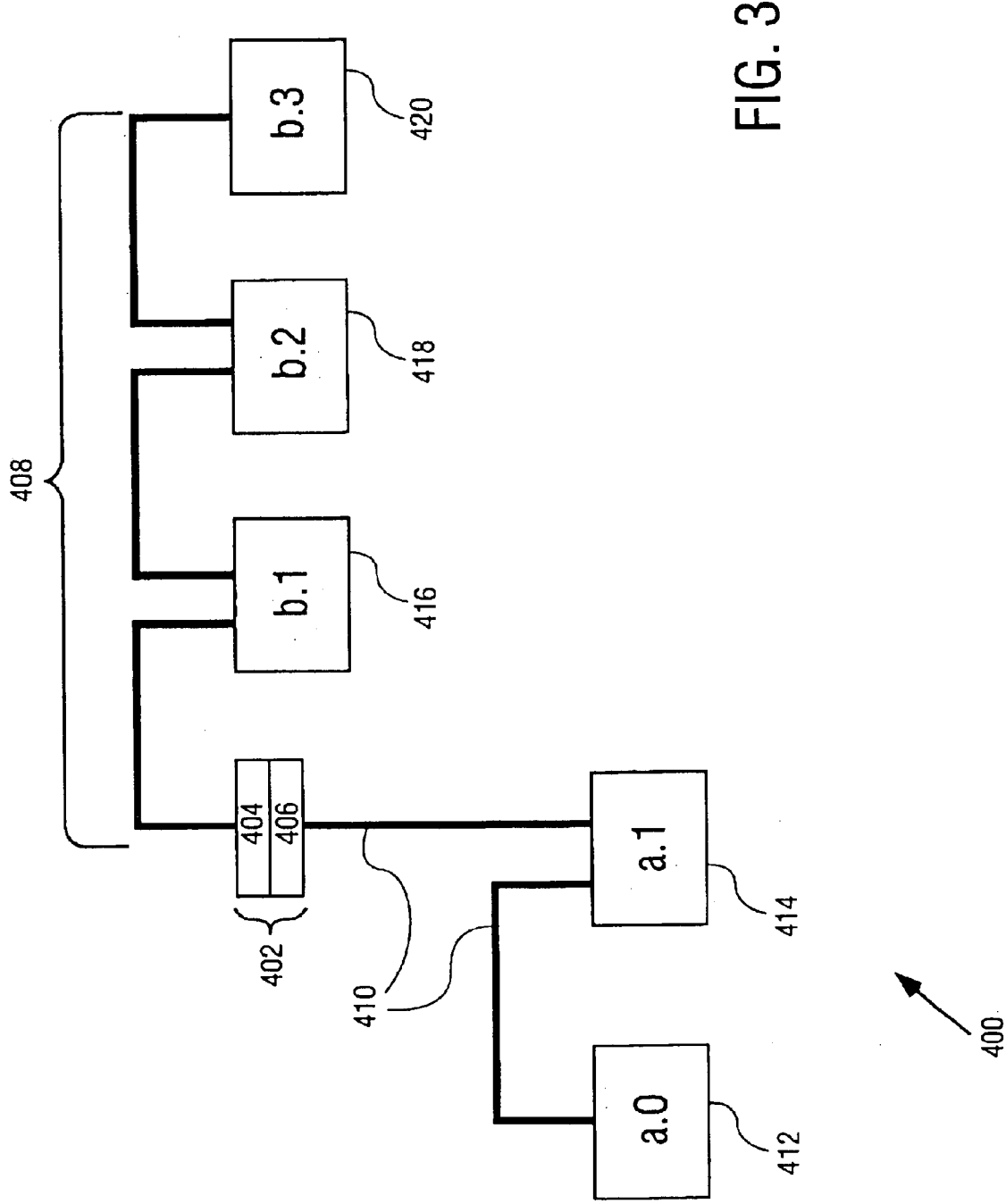
FIG. 3 is a block diagram of one embodiment for a 1394 standard bus bridge system.

FIG. 3 is a block diagram of one embodiment for a 1394 standard bridge bus system 400. Referring to FIG. 3, system 400 includes bridge 402 which connects two or more buses 408 and 410. Bus 408 and 410 may be the same or different types of buses. For example, bus 408 may be a 1394 standard serial bus and bus 410 may be a different high performance bus. The 1394 standard bus architecture limits the number of nodes or devices 310 on a bus 263 and supports multiple bus systems via bus bridge 402.

The control and status register (CSR) architecture, ISO/IEC 13213 (ANSI/IEEE 1212), *Information systems—Control and Status Registers (CSR) Architecture Microcomputer Buses*, defines the 1394 standard bus addressing structure, which allows approximately $2^{16}$ nodes (404, 406, 412–420). The CSR standard defines their registry, their functionality, and, where appropriate, where they appear in the address space.

Figure 4:
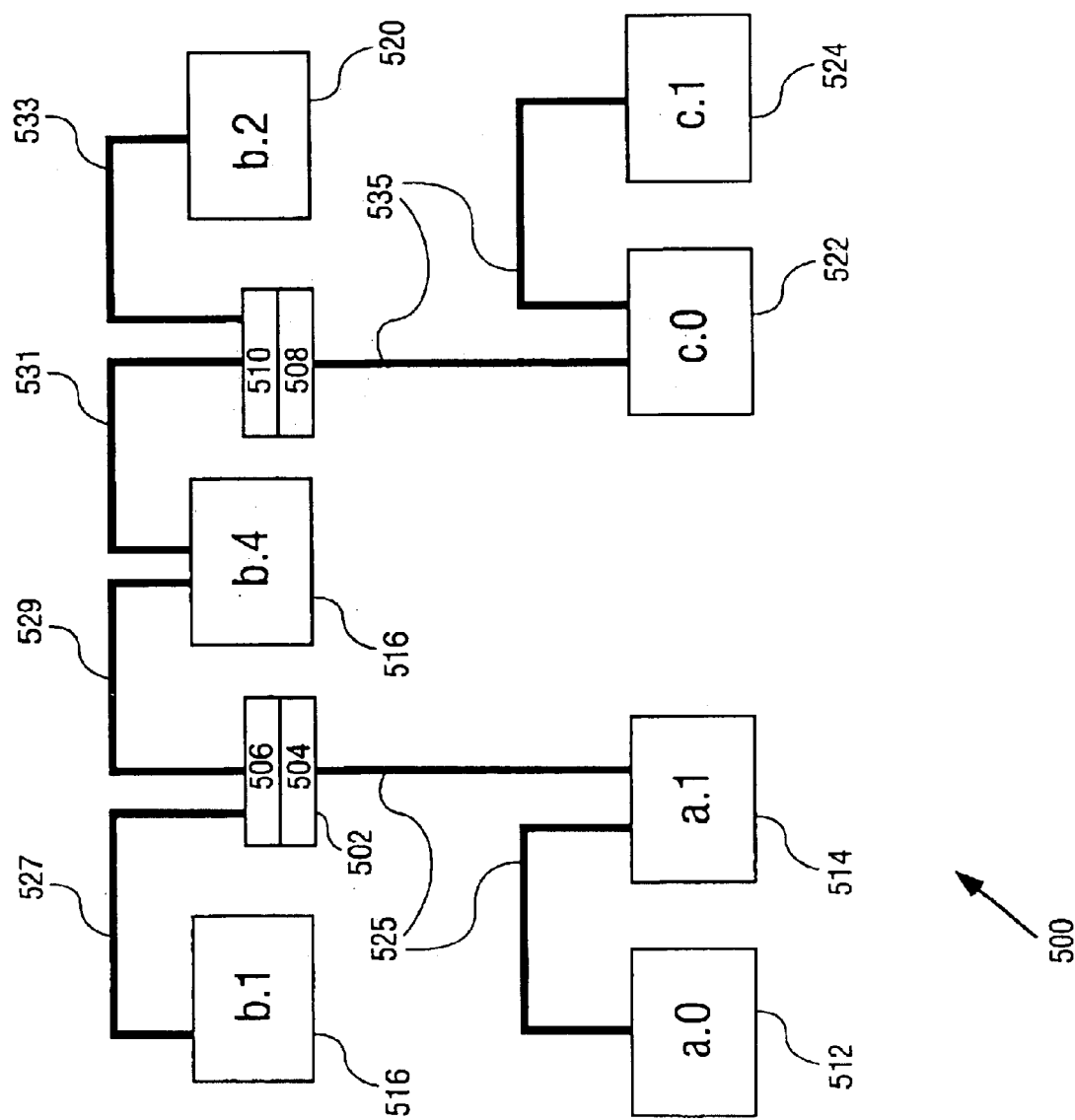
FIG. 4 is a block diagram of one embodiment for a 1394 bus bridge topology.
Figure 5:
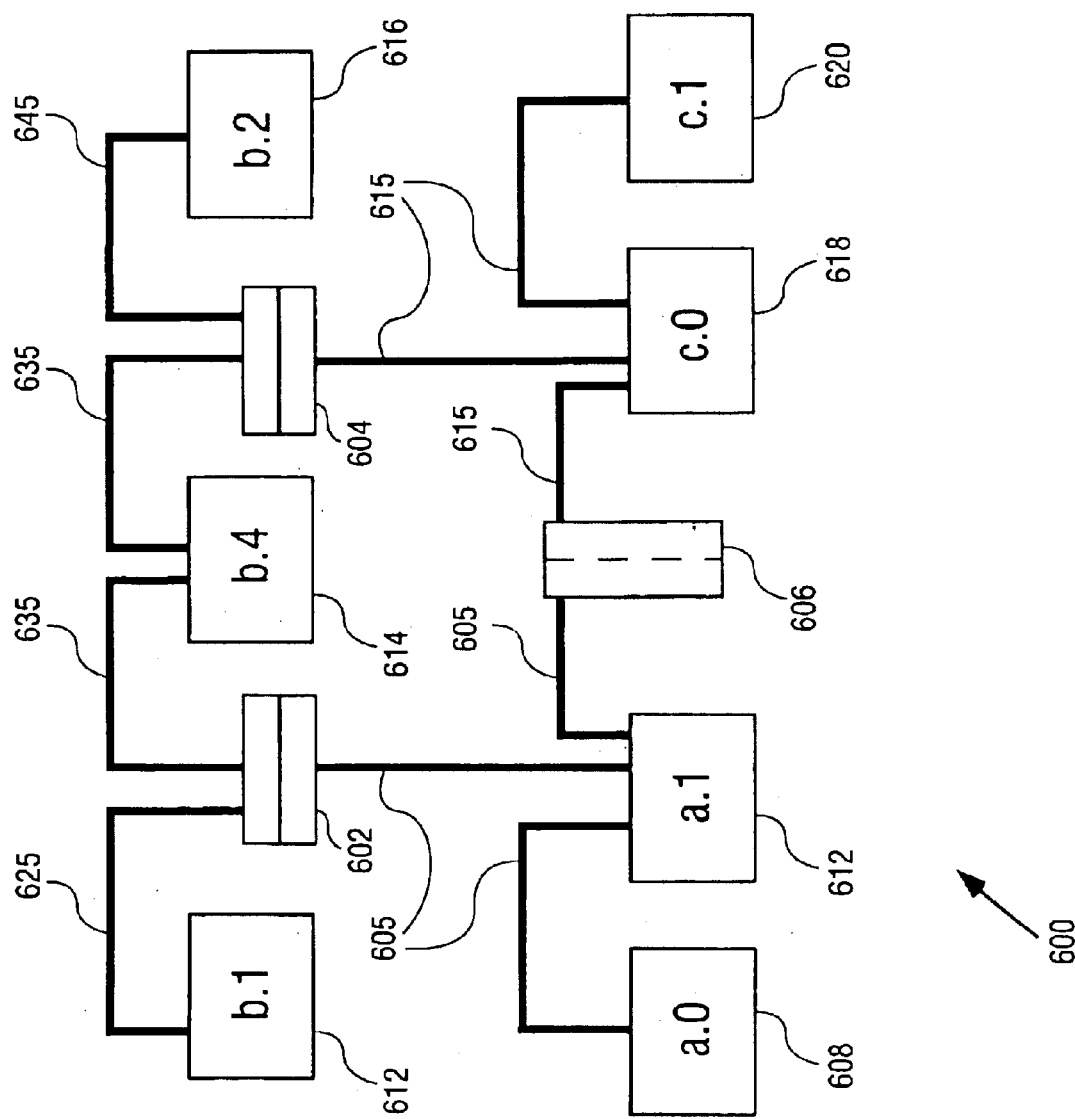
FIG. 5 is a block diagram of one embodiment for a looped bus bridge topology.

FIG. 3 is the simplest instance of a bus topology in which the net has one bus bridge. FIG. 4 illustrates a net that may have more than one bus bridge and, when so structured, is hierarchical in nature. FIG. 5 illustrates a network whose physical topology may have loops, but whose loops are electronically disabled to generate a hierarchical structure. In the description that follows, a collection of multiple buses connected through a bus bridge is referred to as a "net".

FIG. 4 is a block diagram of one embodiment for a 1394 bridge bus topology 500. Referring to FIG. 4, topology 500 has one prime portal 504 and one or more alpha portals 506 and 508. The primary bus 525 has exactly one prime portal 504 and the secondary buses 527, 529, 531, 533, and 535 have exactly one alpha portal each—506, 508 and 510. Each bus 525–535 may have any number of secondary portals. An alpha portal is on the path to a prime portal. Any portal not a prime portal or an alpha portal is a secondary portal. The prime portal or the alpha portal may be referred to as a primary portal.

Within an interconnect topology 500, the bridge portal with the largest portal ID identifier is elected to become the prime portal 504. In an alternate embodiment, the bridge portal with the smallest portal ID identifier is elected to become the prime portal 504. Each portal appears as a node on its attached bus. The bus with the prime portal 504 is termed the primary bus 525 and other buses 527–535 are termed secondary buses. On secondary buses 527–535, the bridge portal that leads to the primary bus 525 is called the alpha portal (506, 508). After a bridge bus interconnect is configured, any node within the interconnect may be accessed by its unique 16-bit node identification address. The node identification address contains the bus ID and the local ID components. Referring to FIG. 4, the bus identification IDs of nodes 512–524 are indicated by the letters a, b, and c and the local ID is indicated by the numbers 0–4.

Alpha portal 504 is responsible for rejecting missed address asynchronous data packets by accepting these requests and returning error reporting responses. The previous and current prime and alpha portal identifiers are used to classify nodes when an interconnect topology changes, and the alpha portal is the isochronous clock reference for other nodes on the bus.

Bus bridge topology 500 may change and be established dynamically during operation of bus bridge system 500. In one embodiment, the bus bridge topology 500 is established during net refresh. Within topology 500, portals selectively route packets. Asynchronous routing tables are stable until topology 500 changes during a net refresh or net reset operation. Asynchronous routing tables are dynamic and are changed by their asynchronous connect and disconnect operations of the protocols.

FIG. 5 is a block diagram of one embodiment for a looped bus bridge topology 600. Referring to FIG. 5, during node 300 addition, portal 606 may be added to the topology 600 forming a loop. Thus, a path exists from a0–b4 through c0 back to a0. During initialization, the redundant portal 606 is disabled so that a hierarchical bus bridge topology remains.

In an alternate embodiment, cyclical net topologies may be allowed. In this alternate embodiment, software routines may partially activate the redundant bridge 606 and allow a shortest path routing between nodes. For example, traffic between bus a 605 and bus c 615 may be efficiently routed without introducing deadlocks.

Figure 6:
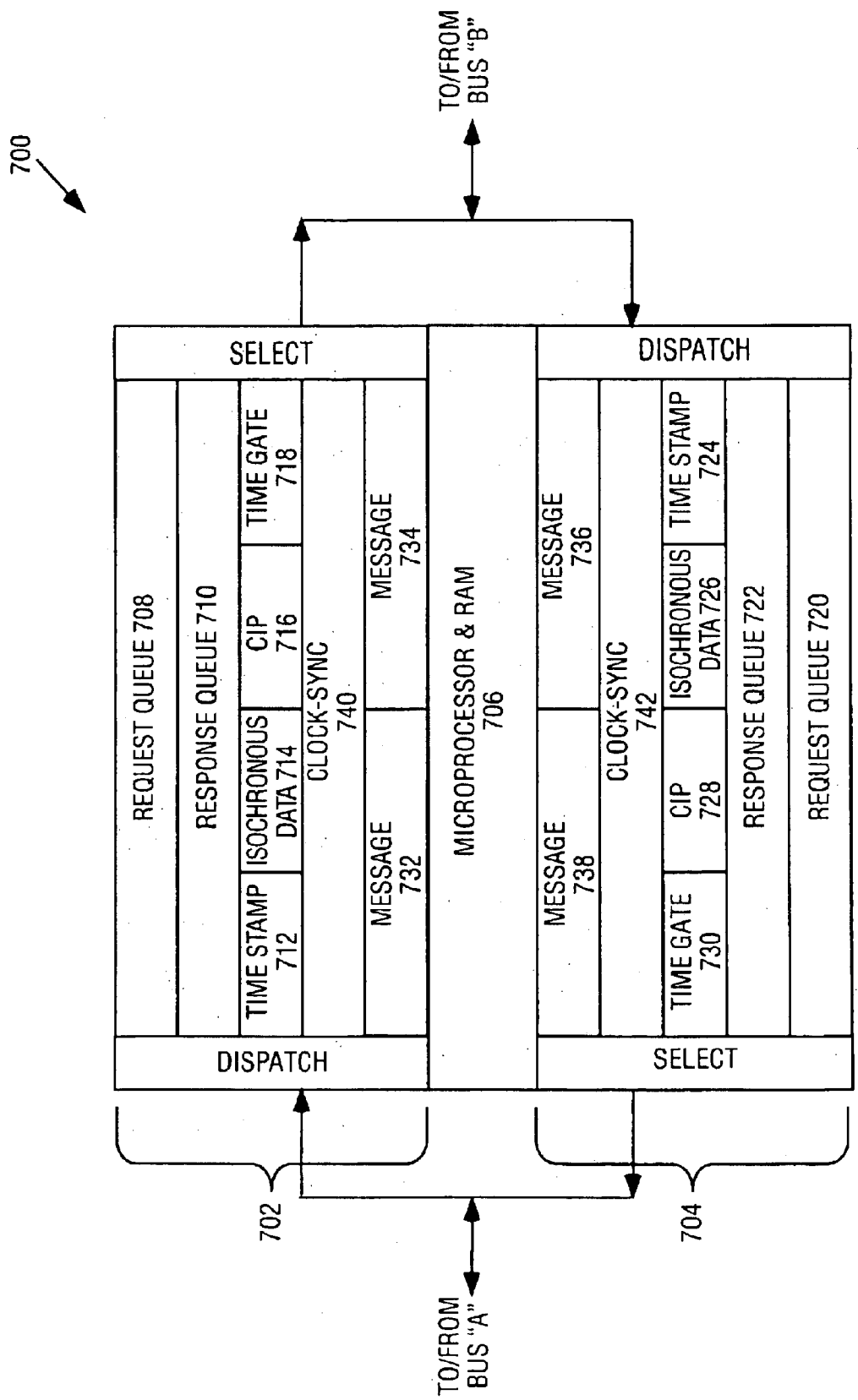
FIG. 6 is a block diagram of one embodiment for bus bridge components.

FIG. 6 is a block diagram of one embodiment for bus bridge components 700. Referring to FIG. 6, bus bridge components 700 are maintained within each portal in which bus "a" to bus "b" components 702 and bus "b" to bus "a" components 704 are independently maintained. Components 700 also contains shared microprocessor and RAM 706.

Asynchronous and isochronous packet transfers may not acquire a bus at the same time. Therefore, asynchronous packets are placed in request queues 708, 720 and response queues 710, 722. The asynchronous packets are selected for transfer at times when isochronous packets are not being transferred. Isochronous packets are received and time stamped 712, 724. Time gates 718, 730 release the isochronous packets 714, 726, together with common isochronous packet (CIP) headers 716, 728, at fixed times. Routing tables select which asynchronous and isochronous packets are accepted and queued for adjacent bus delivery.

Topologies may share physical buffer space rather than implementing physical distinct stacks subject to the following: bus "a" to bus "b" and bus "b" to bus "a" queues operate independently, response processing is never blocked by queued requests, and asynchronous subactions and isochronous packets are forwarded independently. Topologies may block a request behind the previously queued response without generating potential deadlocks; however, requests and responses are processed independently.

Isochronous routing decisions are made by checking the isochronous packet's channel number. Accepted packets are converted and retransmitted on the adjacent bus with newly assigned channel numbers, speeds, and CIP-header and, when a CIP-header is provided, time-stamp parameters 716, 728 from the CIP-header. CIP-headers may be pre-appended to some isochronous packets to further describe their format and function and desired presentation time. When the packets incur delays while traversing through a bridge, then presentation time must be adjusted to compensate for this delay. CIP headers are defined in ISO/IEC 61883 specification. Isochronous packets received in cycle n are forwarded to the adjacent bus in cycle n+k where k is an implementation dependent constant. Messages may be passed around one bus or pass through a bridge by writing to a standardized message location 732, 734, 736, 738 on a bridge's portal. This allows bus-interconnect topologies to be restored while freezing, or discarding when necessary, previously queued subactions.

Distribution of clock-sync information 740, 742 from the primary-bus source is performed by placing calibration information in isochronous-clock pseudo queues before forwarding this information to the clock master on the adjacent portal. In one embodiment, clock-sync information flows from the primary bus downward, so that only one clock-sync pseudo queue may be required.

In support of bus bridges, each node has two node ID addresses: physical ID address and virtual ID address. A physical node ID has a $3FF_{16}$ valued bus ID; a virtual node ID has smaller bus ID addresses. In the absence of bus bridges, all nodes are accessed through their physical addresses. In the presence of bus bridges, the physical address is used to configure the node and the virtual address is normally used thereafter.

Directed-asynchronous routing decisions are made by checking the destination ID addresses of pass-through packets. Accepted packets are directly routed to the bridge's opposing port. In addition, an asynchronous quarantine is maintained which selectively enables forwarding of a request sub-action based on the local identification of a bus-local requester. A set of legacy bits identifies local nodes which requires specific processing of sourced requests and returning responses.

Figure 7:
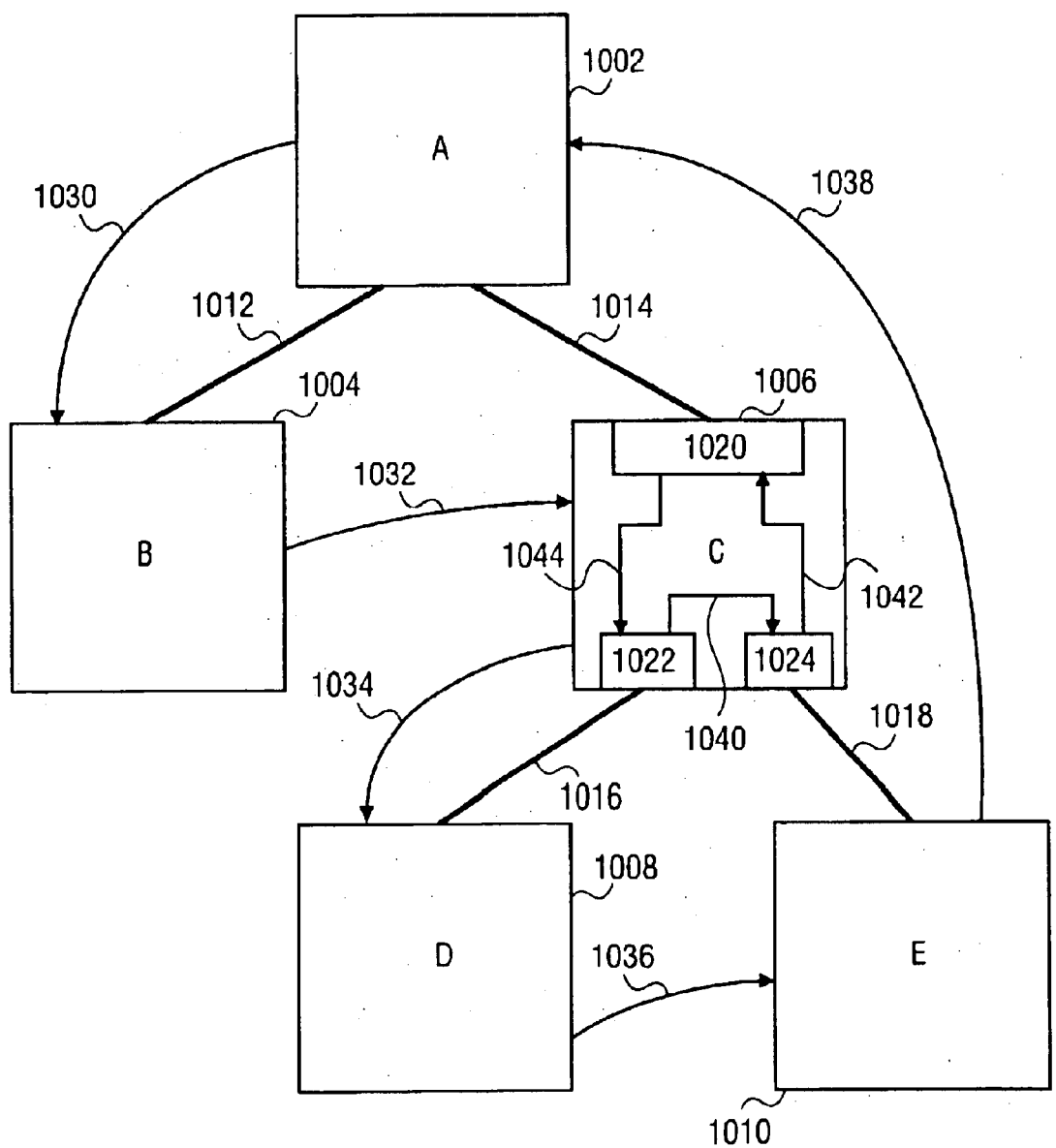
FIG. 7 is a block diagram of one embodiment for a next-neighbor ordering topology.

FIG. 7 is a block diagram of one embodiment for a next-neighbor ordering topology 1000. Referring to FIG. 7, topology 1000 contains a number of nodes 1002, 1004, 1006, 1008, and 1010. Each node 1002–1010 is defined by a relative ring identification (ringID) value made up of the bus identification (busID) and physical identification (phyID) portions. Each node 1002–1010 defines its next neighbor by the relative ringID values in which each node derives the ringID value from the observed self identification (selfID) packets. In one embodiment, a mapping is applied to selfID (packets) in order to arrive at a phyID to ringID mapping. During the self-identify process, each node uniquely identifies itself (selfID), maps its selfID to ringID, and uses its ringID to communicate with its topologically adjacent node.

In one embodiment, the assignment of ringID values is based on a conceptual routing of signals through a node's ports. Using node C 1006 as an example, port[a] 1022 identifies physical port 0, port[b] 1024 identifies physical port 1, and port[c] 1020 identifies physical port 2. Ports 1020–1024 have an implied internal ordering as follows:

| | |
|---|---|
| port[a].in → port[b].out | 1040 |
| port[b].in → port[c].out | 1042 |
| port[c].in → counter → port[a].out | 1044 |

In one embodiment, each node 1002–1010 assigns conceptual ringID values to the other nodes, starting with ringID=0 on its own port[a] 1022 output. The ringID values are assigned by logically tracing a path through other physical ports, incrementing the ringID when logically passing through the port[a] 1022 output.

The bus itself defines protocols for sending selfID packets for purposes of assigning unique phyIDs to each of the attached nodes. Although phyIDs are guaranteed to be unique, they are not guaranteed to be the same if the bus is reset again. Thus, there is a need for defining ringIDs which do not change unless the cable topology actually changes.

This assignment strategy always yields the same next-neighbor selections, despite changes in the selected-root assignment or a change in the root node. Thus, in the example shown in FIG. 7, node B 1004 determines that node C 1006 is its next neighbor, node C 1006 determines that node D 1008 is its next neighbor, node D 1008 determines that node E 1010 is its next neighbor, node E 1010 determines that node A 1002 is its next neighbor, and node A 1002 determines that node B 1004 is its next neighbor. The topology, rather than the physical nodes, is traced by following paths 1030, 1032, 1034, 1036, and 1038 from a port to its next neighbor, and any node 1002–1010 may be used as the root.

Figure 8:
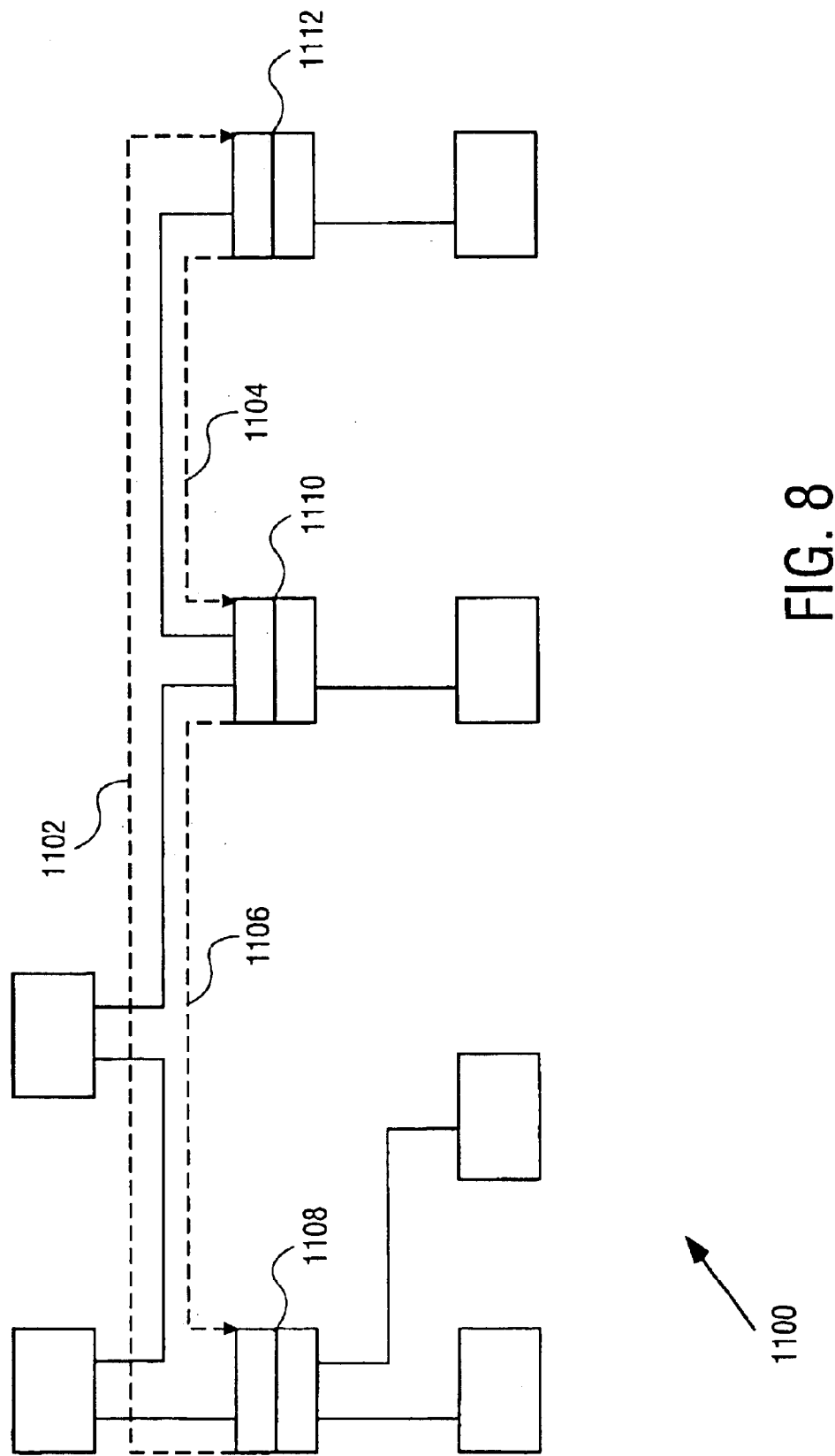
FIG. 8 is a block diagram of one embodiment for a portal-to-portal net refresh message path topology.

FIG. 8 is a block diagram of one embodiment for a portal-to-portal net refresh message path topology 1100. A net refresh is used to assign unique busIDs to each node in the system. Referring to FIG. 8, the communication protocols for net refresh involve the sending of messages from each portal 1108, 1110, 1112 to its neighbor in a daisy-chained fashion. In one embodiment, these responseless write messages are idempotent, so that missing-ack failures may be simply and safely retried (e.g. multiple writes have the same effect as one write).

A net refresh is typically triggered by a bus reset. After the bus reset completes, each portal 1108, 1110, 1112 sends messages to its next neighbor, allowing messages to flow in a circular direction. Thus, the topology-dependent, root-independent portal ordering is available after bus reset. This allows each portal 1108–1112 to circulate messages by sending them in a next-neighbor ordering.

In the example shown in FIG. 8, portal 1108 first sends a message via path 1102 to portal 1112, portal 1112 then sends a message via path 1104 to portal 1110, and finally, portal 1110 sends a message via path 1106 to portal 1108. In this context, "next" means the portal with the next larger ringID assignment.

In one embodiment, a 2-bit precedence is pre-appended to the portal's 64-bit extended unique identifier (EUI) to generate a stable refresh identifier (refreshID). The prime portal's EUI also serves as the context identifier for bridge routing tables. The refreshID allows topology 1000 to specify prime-portal preferences. To coordinate activities when resets occur on multiple buses, a prime portal is selected to coordinate the net refresh activities. In any net, the local-bus portal with the largest refreshID is selected to become the net's prime portal.

Write messages that incur errors or busy indications are immediately retried until successful. Confirmations are provided by allowing these write messages to circulate through other portals until they return to the origin portal. The constant sending of these responseless write messages ensures their successful completion without mandating special fault-retry protocols. The circular nature of the communication allows the originator of these write messages to verify their completion. Such communications are sufficient for reliable broadcasts, but are more flexible because write payloads may be modified as they pass through connected portals.

In one embodiment, a bus reset may occur when a new node is attached to the net. The bus reset has the effect of invalidating the bus ID address contained within the node ID registers of local portals, which effectively isolates them from the remaining portion of the net. A net refresh acquires a new bus number for the reset bus without affecting the busID addresses or routes of other portals.

A net refresh starts with messages sent between local bus bridge portals. A prime-portal is selected to coordinate the net refresh operation. Each node sends acquisition messages to its next neighbor, and these messages initially contain refreshID (a prime-portal selection identifier). Each candidate portal monitors incoming refreshID values and changes to a subservient portal when a larger refreshID is observed. In one embodiment, the largest refreshID value eventually circulates to all local portals, as illustrated by FIG. 8. In alternate embodiments, other refreshID values may be used to determine the prime-portal. The acquisition message supplies the refreshID, as well as a bus Count and portal Count.

The portal Count value in the acquisition messages is incremented when passing through the portals. This ensures the eventual demise of rogue resets, by allowing them to be aged until dead. Reset messages are sent periodically, once each arbitration interval, until the net refresh completes. In the absence of continuous messages, portals time out and attempt to become prime portals.

The net refresh eventually forms a spanning tree by circumscribing the paths through bus bridge portals 1108–1112. Each portal communicates with its adjacent neighbor by writing messages into a standardized control and status register (CSR) location. During the final state of a net refresh, the portal-to-portal messages flow in the direction of paths 1102, 1104, and 1106.

At the conclusion of the net refresh, each node has a net-unique nodeID consisting of busID and localID components. A node's localID equals its phyID. In addition, each portal has a distinctive portal identifier (portalID) that may be used to navigate through the topology.

In one embodiment, a net-changed indication is broadcast to all nodes during a net refresh. As no packets are corrupted if this notification is ignored, the system is not compromised by these unconfirmed broadcast indications. This event notification allows nodes to determine when bus numbers have changed or when audio/video (AV/C) controller reconnections are required. AV/C protocols are used to establish, monitor, and release isochronous connections as required. The net-changed event is bus-local and is sent during net refresh. Since all portals are communicating with others during net refresh, the coordination of these bus-local resets comes out of the net-refresh sequencing. During the net refresh, each of the dominant (prime or alpha) portals is responsible for distributing the net-changed event indication to locally attached secondary portals.

One of the reasons for invoking a net refresh is to resolve inconsistent or ambiguous non-local isochronous resource allocations. The listener and talker proxies assume this obligation, allowing resources to be reclaimed (or lost) in a timely fashion.

A net refresh refers to the sequence of actions that assign busID addresses and establish the bus bridge routing tables. The term net refresh is used because the effects of a net refresh on the bridge portals within the net are similar to, but less disruptive than, the effects of a bus reset on the nodes attached to the bus.

In one embodiment, the net refresh maintains the previous busID assignments, bridge portal routing tables, established isochronous channels, and queued subactions.

A configuring net refresh (often abbreviated as configuring refresh) has the effect of assigning non-conflicting busID addresses to each of the attached buses. When busIDs conflict, either with a currently assigned busID or a DIRTY (previously assigned) busID, new FREE busIDs are assigned.

As an example, a configuring refresh occurs on the surviving portion of a severed net (assuming that a sufficient number of FREE-state busIDs remain).

A cleansing net refresh (often abbreviated as "cleansing refresh") has all of the properties of a configuring refresh and (in addition) initiates the DIRTY-to-FREE recycling of stale busIDs by setting quarantines in each bus-bridge portal. After the quarantines have been set, the portal can recycle DIRTY busIDs after a time delay of $T_{dirt}$. The $T_{dirt}$ value is the maximum time a transaction can remain queued before parsing of the bus bridge.

A cleansing refresh is typically performed when the number of DIRTY busIDs exceeds the number of FREE busIDs. The intent is to recycle the DIRTY busID states, to avoid the invocation of a more disruptive purging net refresh. A net refresh is also invoked on the victim portion of a severed net, to reduce the disruption of survivor subnet buses when the victim and survivor sub-nets are reconnected.

A purging refresh is performed when the number of desired busIDs exceeds the number of FREE busIDs. Although a cleansing refresh would eventually change busIDs from DIRTY-to-FREE, the purging refresh avoids the delay associated with the cleansing-refresh recycling process.

Since bus bridges may have previously-queued transactions with DIRTY-state busID addresses, these queues are purged. This occurs quickly and without timeout-related delays, with the disadvantage of disrupting currently-active transactions.

During the net refresh, nodes communicate the parameters related to in $T_{dirt}$ in net refresh messages so as to compute the worst case values. The maximum number of hops, N, between any requester and any responder is also computed and distributed to portals during net refresh.

Figure 9:
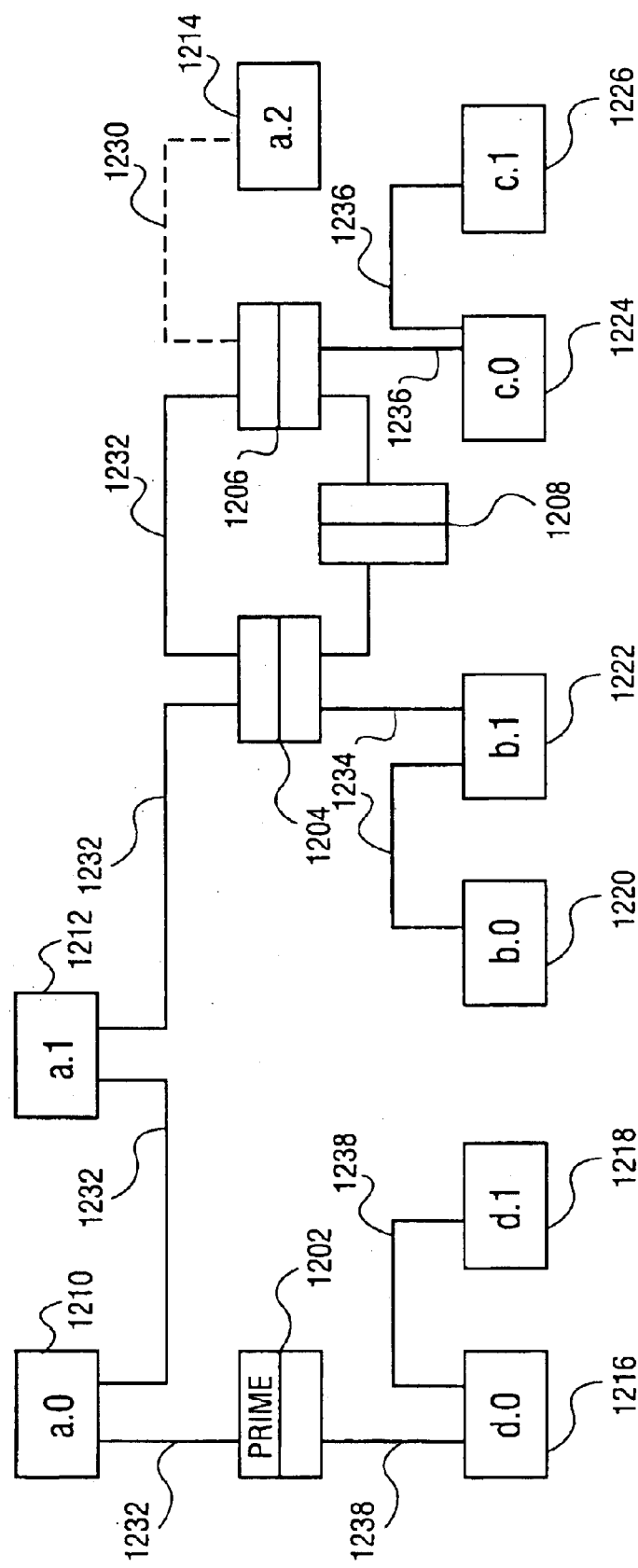
FIG. 9 is a block diagram of one embodiment for a net refresh message path topology during the addition of a node.

FIG. 9 is a block diagram of one embodiment for a net refresh message path topology 1200 during the addition of a node. Referring to FIG. 9, topology 1200 consists of prime portal 1202, alpha portals 1204, 1206, 1208, primary bus 1232, secondary buses (1238, 1234, and 1236), existing nodes (1210, 1212, 1216, 1218, 1220, 1222, 1224, 1226) and a node to be attached 1214.

"Net refresh" refers to the sequence of actions that assigns bus identification addresses and establishes the bus bridge routing tables. The term refresh is used because the effects of a net refresh on the bridge portals in the net are similar to, but less destructive than, the effects of a bus reset on the nodes attached to the bus. Whenever possible, the net refresh maintains the previous bus identification assignments, bridge portal routing tables, establish isochronous channels, and queued sub-actions. A net initialization established the spanning tree as described above for the topology and assigns non-conflicting busIDs.

In one embodiment, three forms of net initialization may be specified: 1) net refresh, which assigns new busIDs, 2) net restart, which is a net refresh plus delayed busID recycling quarantine overhead for recently active requesters, and 3) net reset, which is a net refresh plus immediate busID recycling and transaction termination for currently active transactions. During bus resets, each bridge portal is assumed to be aware of the bridge portal next neighbor with the next larger ringID address as described above. In this embodiment, local daisy chain sequences are possible. For example, portal A sends messages to portal B, portal B sends messages to portal C, and portal C returns messages to portal A.

A net refresh may occur when a new node 214 is added to the topology 1200. In one embodiment, a net refresh configures a primary bus 1232 with one primary alpha portal 1202. Other secondary buses (1238, 1234, and 1236) and one alpha portal 1204 are also configured during a net refresh.

Net reset is a multi-phase operation, as discussed in reference to FIGS. 10 and 11 below. In one embodiment, the net reset is accomplished in three stages: the acquire stage, the breach stage, and the commit stage. The initial acquire and breach phases select the prime portal and detect addressing conflicts, while the final commit phase assigns busID assignments, establishes routing tables, and, when necessary, purges asynchronous bridge queues. During the acquire phase, periodic acquisition messages are distributed to other bus local portals. During the breach phase, the acquired portals sequentially extend their acquisitions to adjacent buses. During the commit phase, the prime portal sends commit messages, allowing bus numbers and routing tables to be updated.

Referring to FIG. 9, the addition of node 1214 may invoke a net reset. The net reset invalidates local busID assignments and all reset portals (1202, 1204, and 1206) become prime portal candidates. Each reset portal 1202–1206 attempts to restore its own invalid busID addresses and disables pass-through traffic. In an alternate embodiment, reset portals 1202–1206 may allow local traffic and some amount of pass-through traffic.

During a purging net refresh, topology 1200 is left in a known initial state. Purging refreshes are designed to be robust and timely, which requires them to be more disruptive. The process of initializing net topology 1200 involves formation of a spanning tree by circumscribing the net while passing through bus bridge portals, as illustrated in FIG. 7. For stability, the node with the largest refreshID is selected to become the prime portal (in the examples of FIGS. 10 and 11, it is assumed that portal 1202 becomes the prime portal). The prime portal's extended unique identifier (EUI) is also the basis for the contextID that is distributed among the nodes.

In the discussion that follows, a net refresh is assumed to be initiated by prime portal 1202. However, a purging net refresh may be initiated by any portal. If a purging net refresh is initiated by a non prime portal, the initial net refresh messages would eventually propagate the prime portal, which (due to its larger refresh identifier) would become responsible for completing the net refresh, as discussed below.

Figure 10:
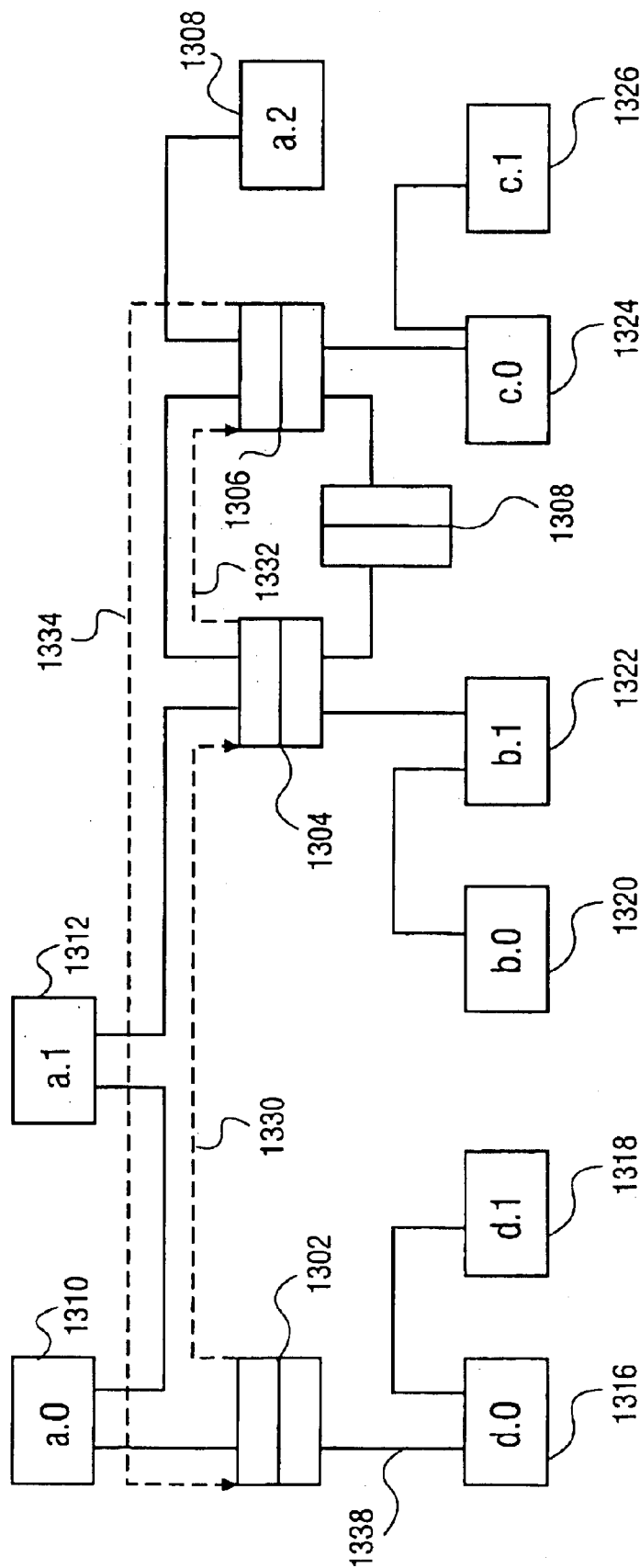
FIGS. 10 and 11 are block diagrams of one embodiment illustrating a purging net refresh.

FIG. 10 is a block diagram of one embodiment illustrating a purging net reset of interconnect 1300. A net reset may occur when a new node 1314 is attached to interconnect 1300. The net reset has the effect of invalidating portals (1302, 1304, 1306, 1308) nodeID and busID addresses. This has the effect of isolating the portals from external access. In the example of FIG. 10, the net reset on interconnect 1300 is assumed to be initiated by the prime portal 1302. However, all reset bus portals (1302, 1304, 1306, 1308) may act as the prime portal, and the prime portal status is speculative and must be reconfirmed during net refresh (as described in reference to FIG. 7).

A net reset begins with a "reset acquire" message sent between bus bridge portals 1302–1308. The first of these messages is sent from prime portal 1302 and circulates through secondary portals 1304 and 1306 on the primary bus 1342. The message paths are indicated by hash lines 1330, 1332, and 1334, beginning at prime portal 1302.

As discussed above, portalID values in the net reset packets are incremented when passing through the not yet enumerated bus bridge portals (1302–1308). This ensures the eventual demise of rogue resets by allowing them to be "aged until dead." In one embodiment, reset messages are sent periodically, once each arbitration interval, until the net refresh completes. In the absence of a prime portal's resets, other portals may timeout and attempt to become prime portals. Candidate portals (1302–1308) recognize their loss (i.e., not the prime portal) when higher precedence acquire messages are observed, whereupon the portals forward the messages to other portals (next neighbor).

The acquisition of the primary bus completes when the candidate's message returns to the candidate. For example, prime portal 1302 sends a message via 1330 to portal 1304 to acquire bus 1342. The message is passed from portal 1304 via 1332 to portal 1306 and from portal 1306 via 1334 to portal 1302. Once the acquire message returns to portal 1302, portal 1302 acquires its own bus 1342.

Figure 11:
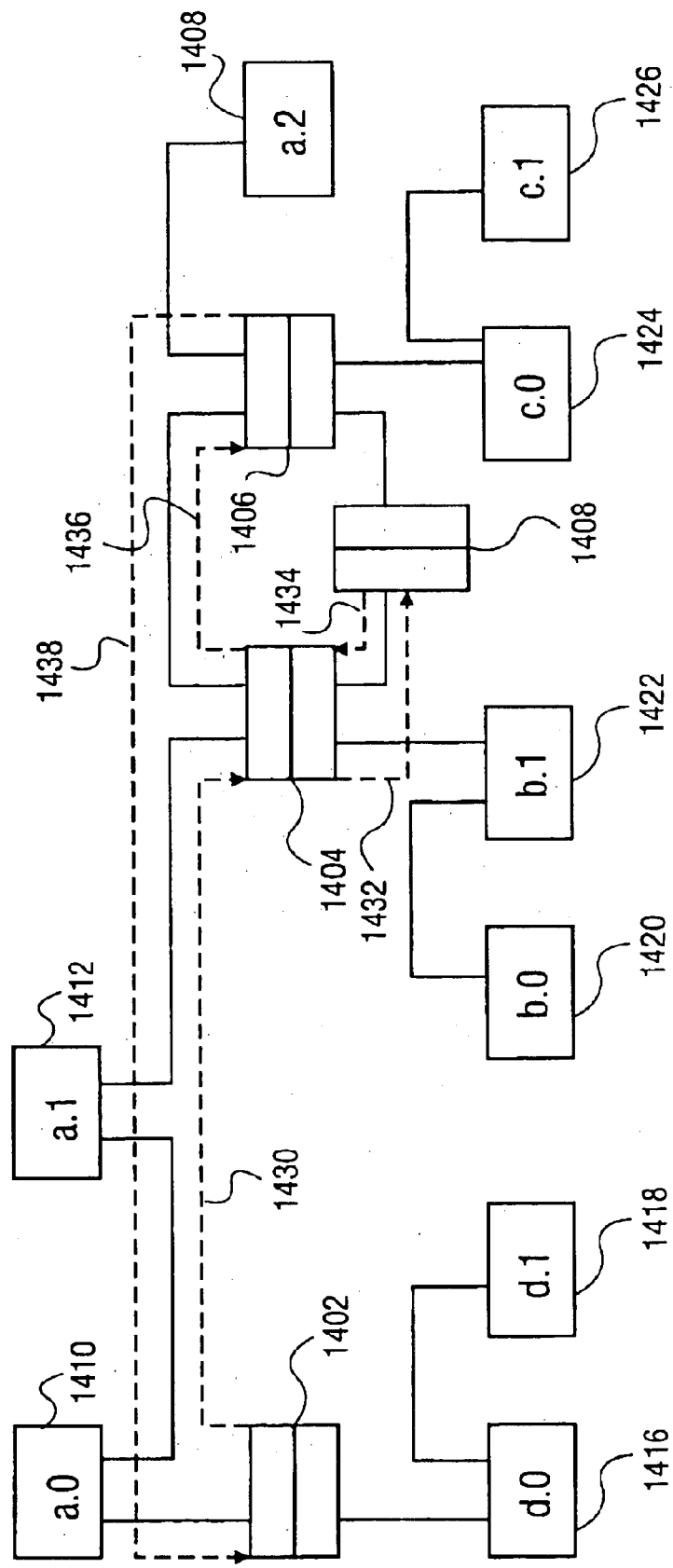

After the primary bus 1342 has been acquired, the prime portal transmits a breach message as illustrated in FIG. 11. Prime portal 1402 transmits a breach message via path 1430 to portal 1404. The receipt of a breach message by portal 1404 causes portal 1404 to breach onto adjacent bus 1444. The breach commands trigger sequential acquisitions of adjacent buses. The reset breach message initiates the acquisition of the first remote bus 1444 as indicated by paths 1432, 1434, and 1436.

After adjacent buses are acquired, breach packets are sent to initiate a remote bus acquisition. The next portal on the adjacent bus observes the returning reset acquire indication and propagates a reset breach indication to its adjacent bus. That reset acquire circulates and acquires the third bus and subsequent portals. For example, portal 1404 breaches 1408 to acquire bus 1446. The breach messages eventually circulate through all remote buses. The breach messages may reach leaf buses (a leaf bus has no other attached portals) or may close in on themselves when they pass through a bus bridge and discover that the adjacent portal has been acquired by the same candidate portal. The breach messages establish tentative busID assignments and routes; however, these are not activated until the final commit phase. During remote bus acquisition, the breach packets avoid previously acquired buses.

As in the primary bus acquisition, all bus acquisitions complete when the breach messages return to the initiating portal. After the breach is completed, the net knows the addresses that may be reclaimed, which addresses are free, and how many nodes are trying to claim free addresses.

The commit phase begins after the breach packets return bridge routing tables to the initiating prime portal 1402. During the commit phase, the bridge routing tables are updated and the busID assignments are finalized. The commit phase changes the bus bridge paths and opens closed bridges. During the commit phase, all portals receive assignments and routing information. After the commit phase is complete, all blocked portals are released and traffic may commence. Commit packets are sent, initiating the prime portal 1402 and traversing the interconnect topology 1400. The commit completes when the commit packets return to the prime portal 1402. Normal operation of the net is possible at this time, as the sending of the commit messages stops and the bridges become operational.

Figure 12:
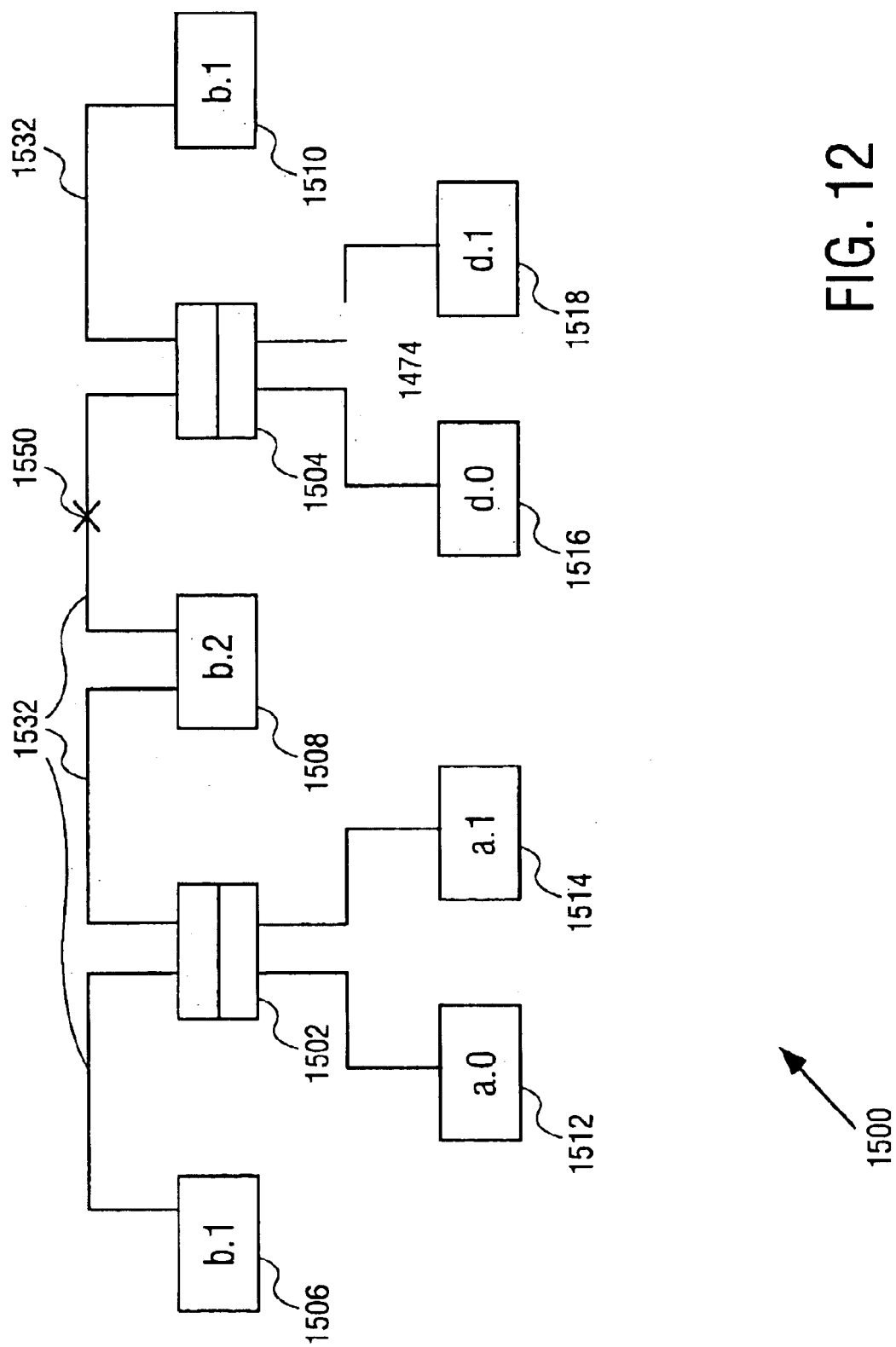
FIGS. 12, 13, and 14 are block diagrams of one embodiment for a secondary bus reset after node detachment.
Figure 13:
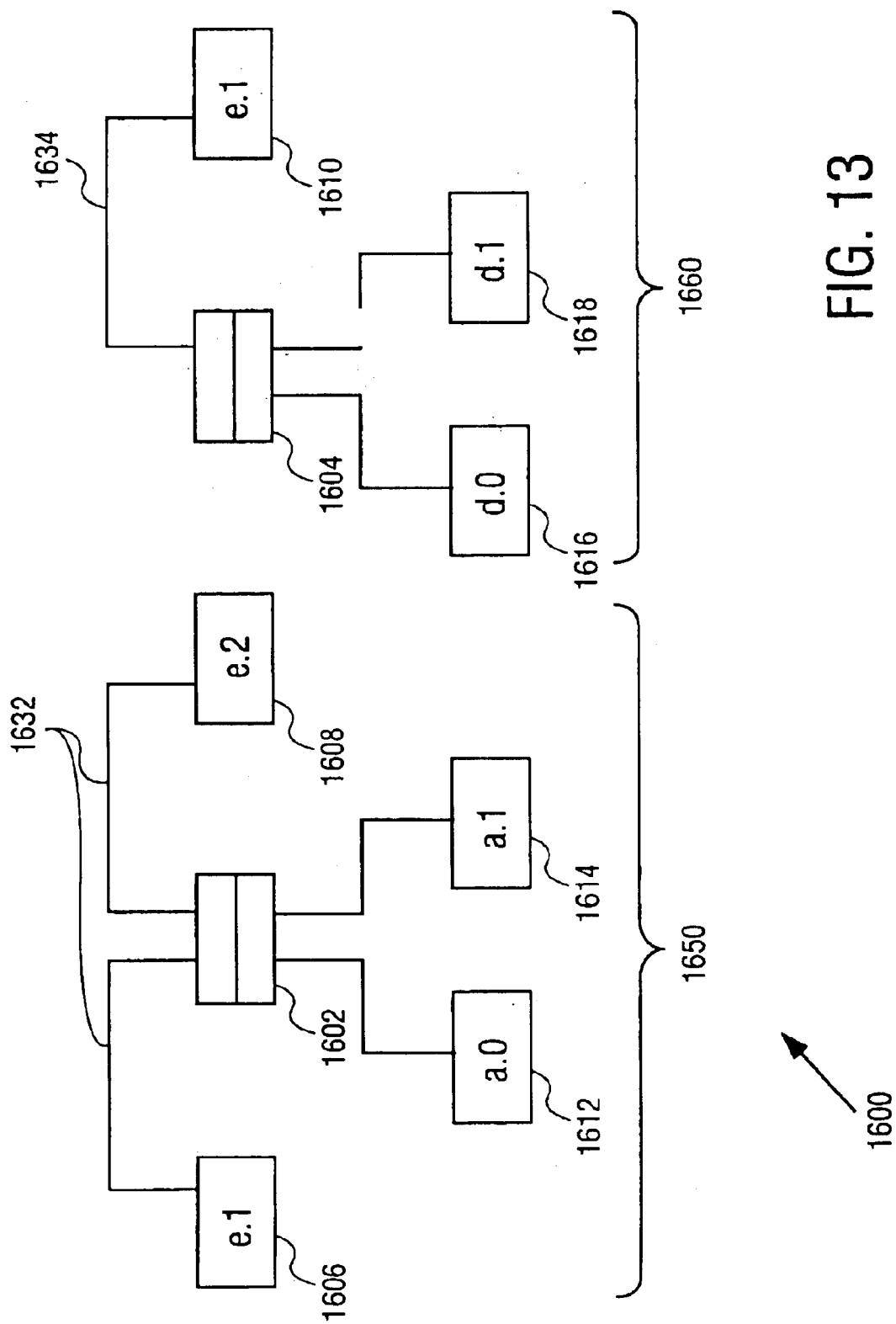
Figure 14:
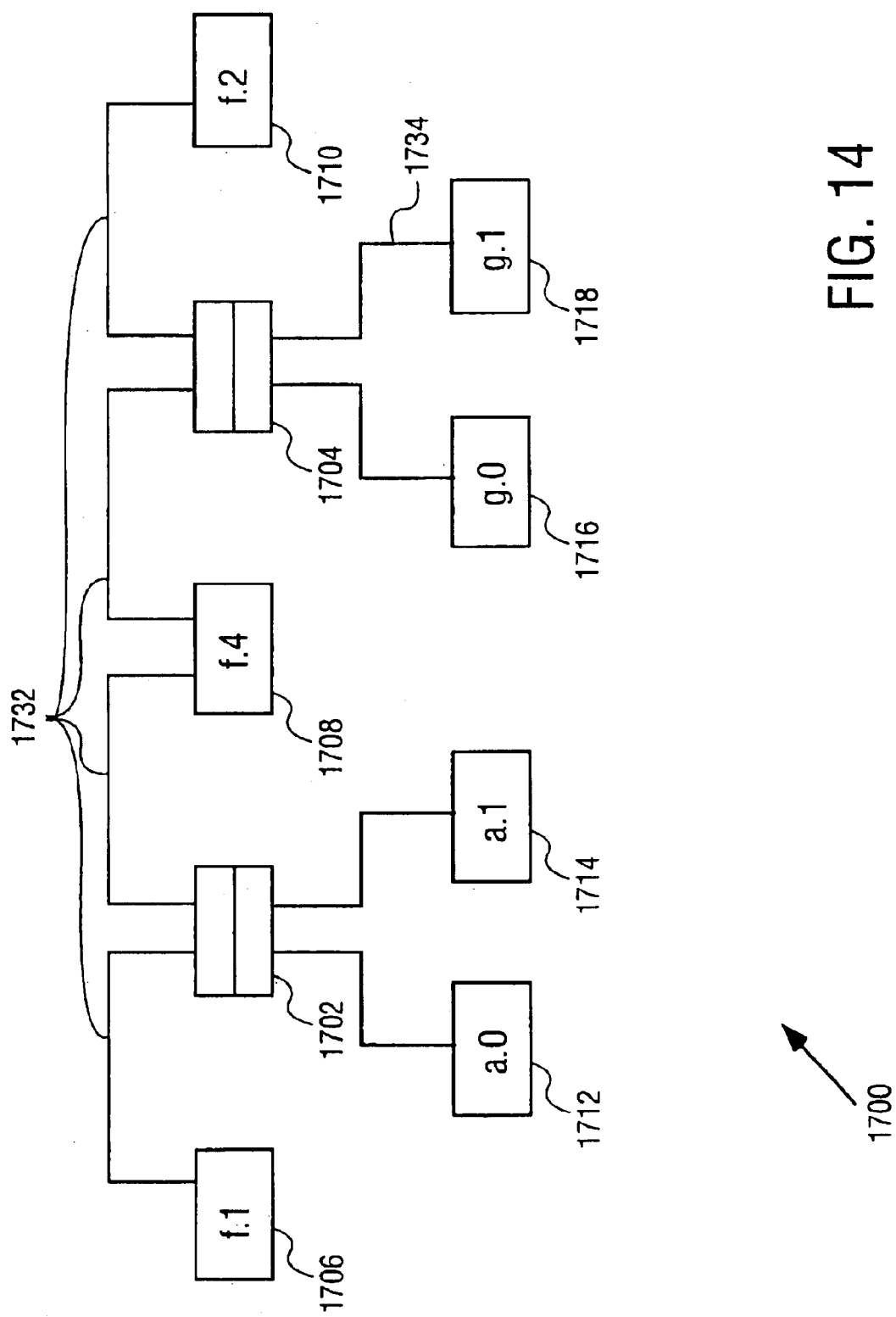

FIGS. 12, 13, and 14 are block diagrams of one embodiment for a secondary bus reset after node detachment.

FIG. 12 is a block diagram illustrating the subnet 1500 prior to this connection. Referring to FIG. 12, subnet 1500 consists of prime portal 1502 and secondary alpha portal 1504. Two subnets may be disconnected during operation of the interconnect by, for example, pulling a cable or detaching a bridge portal. During a disconnection, one subnet is referred to as the survivor subnet and one is referred to as the victim subnet. During a disconnection, both subnets at the disconnection point receive new busIDs.

For example, if a disconnection occurs at point 1550 in FIG. 12, the two surviving subnets are as shown in FIG. 13. The original bus 1532 is shown as buses 1632 and 1634. In this example, it is assumed that subnet 1650 is the survivor subnet and that subnet 1660 is the victim subnet. The nodes 1606 and 1608 on the survivor subnet 1650 receive new busIDs, as indicated by the change of letter in the figure. (For example, node 1506 is changed from "b.1" to "e.1" in node 1606.) In addition, node 1610 receives a new busID. The victim subnet 1660 identification is removed from the tables within the survivor 1650 portal tables. Thus, within survivor subnet 1650 previous busIDs of b, c, and d are invalidated and marked as previously used. Within the victim subnet 1660, the previously used busIDs are marked as invalid in preparation for a reconnect.

During the reconnection of the subnets, new busIDs are assigned within the victim subnet 1660. In addition, a new busID is assigned to the merged reset bus, as illustrated in FIG. 14. Thus, in the example of FIG. 14, new busID F is assigned to the merged bus 1732 and a new busID G is assigned to bus 1734 in the previous victim subnet 1660. Because busIDs B, C, and D were marked as invalid in the prior disconnection, these busIDs are no longer used. In addition, the assigned busID of E that was used in FIG. 13 to indicate the disconnection is also not used during the reconnection process. A new busID F is assigned to the merged, rejoined bus 1732. The survivor subnet 1650 has an unchanged prime portal 1702 identifier (a in the example) and other survivor buses keep their assigned busID addresses. The victim subnet 1660 has a changed prime portal 1704 identifier and other victim buses are assigned new busID addresses, as required.

FIGS. 12, 13, and 14 illustrate one embodiment of a configuring net refresh. A configuring net refresh has the effect of assigning non-conflicting busID addresses to each of the attached buses. When busIDs conflict, either with the currently assigned busID or a dirty, (that is, previously assigned) busID, new free busIDs are assigned.

A cleansing net refresh is similar to a configuring net refresh as the recycling of "dirty" to "free" of stale busIDs by setting quarantines in each bus bridge portal. After the quarantines have been set, the portal may recycle dirty busIDs after a time delay of $T_{dirt}$. The $T_{dirt}$ value is the maximum time a transaction can remain queued before passing into a bus bridge. A cleansing net refresh is performed when the number of dirty busIDs exceeds the number of free busIDs within the busID tables. The cleansing net refresh recycles the dirty busID stage to avoid the invocation of more disruptive purging net refresh. A cleansing net refresh is also invoked on a victim portion of the subnet to reduce the disruption of survivor subnet buses when the victim and survivor subnets are reconnected.

A purging refresh is performed when the number of desired busIDs exceeds the number of free busIDs. Although the cleansing refresh would eventually change busIDs from dirty to free, the purging refresh avoids the delay associated with the cleansing refresh recycling process. Because bus bridges may have previously queued (stale) transactions with dirty busID addresses, these queues are purged during a purging net refresh. This occurs quickly without timeout related delays. However, a purging net refresh disrupts currently active transactions.

When subnets are reattached, as exemplified in FIG. 14, it is necessary to consistently determine which nodes are survivor nodes and which are victim nodes when the two sets of bus addresses are collapsed into one. In one embodiment, the prime portal may determine which portals are on the victim or survivor sub-net. The sub-net which contains the prime portal is the survivor subnet. The sub-net which acquires a new prime portal is called the victim sub-net. The prime portal is defined as the portal with the largest refreshID.

In one embodiment, the refreshID is determined by attaching a two bit preference to the EUI of the portals and using this value to determine the prime portal. The "EUI plus preference" value is transmitted with the net refresh messages from next neighbor to next neighbor and each portal votes on the refreshID value.

In one embodiment, the portal with the largest refreshID value is used as the prime portal. In an alternate embodiment, the portal with the smallest refreshID value may be used as the prime portal. In alternate embodiments, any manner of comparison or arithmetic ordering of EUI values may be used to determine a unique node such as the smallest bit-reversed EUI value or the node with the largest portal ID value.

In one embodiment, the EUI plus preference value is passed through the interconnect. This scheme has two purposes: 1) identify the prime portal to other portals; and (2) allow the prime portal to determine when all others have observed its messages, because only then do the messages return to the prime portal.

Figure 15:
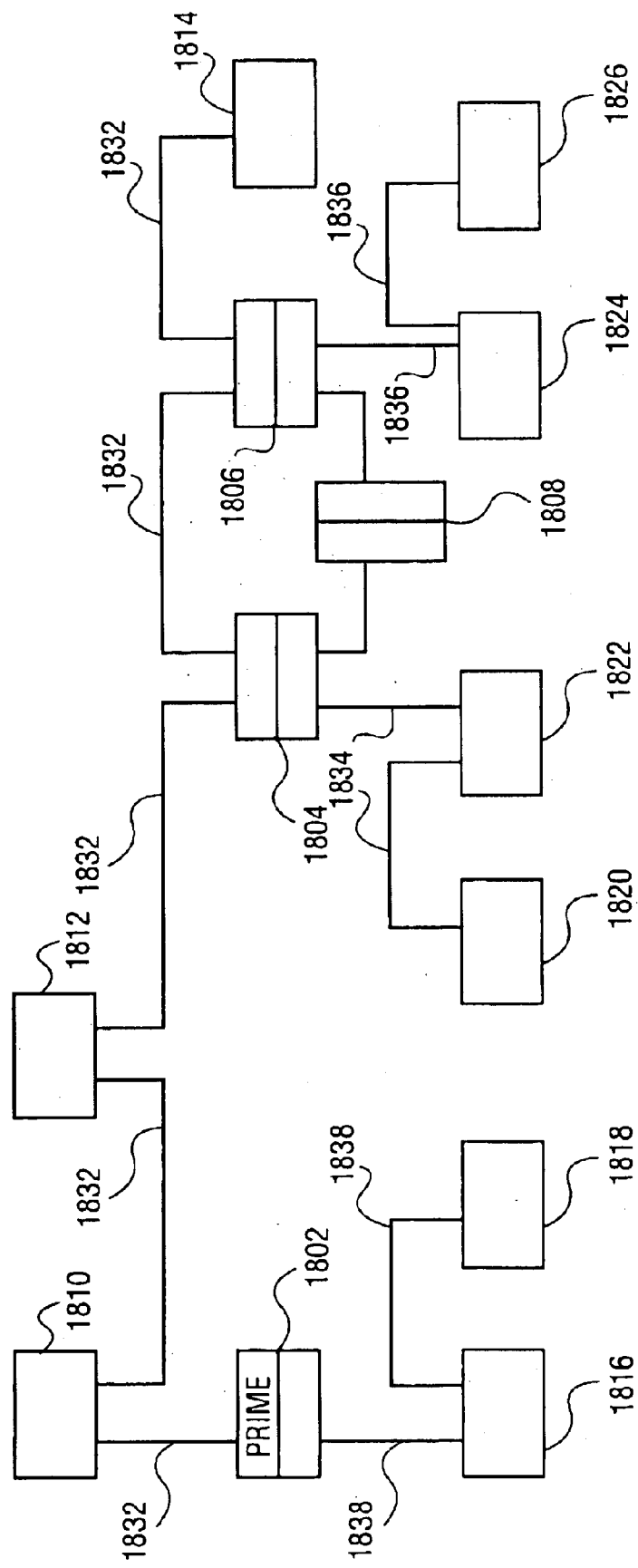
FIG. 15 is a block diagram of one embodiment for an interconnect broadcast topology.

FIG. 15 is a block diagram of one embodiment for an interconnect broadcast topology 1800. A broadcast message may be used after busIDs have changed, for example, when one or more nodes may have been removed, one or more nodes may have been added or the nodeIDs have changed within the interconnect. The broadcast is implemented as two-phase process: first, portals communicate between themselves using directed messages, as described herein, and, second, one of the portals, typically the alpha portal, uses a broadcast transaction to communicate the event to other bus-local nodes. Thus, only bus-local broadcast transactions are required to be sent. This is valuable because the IEEE 1394 standard serial bus defines mechanisms for bus local broadcast but has no provisions for flow controlling these writes based on remote bus loading. Under certain conditions, a bus bridge portal may receive more broadcasts than it can source on an adjacent bus, and some will be discarded. Thus, there is no assurance that normal broadcast transactions can be successfully forwarded through remote buses.

Referring to FIG. 15, any node (1810–1826) may initiate a broadcast message by writing that message to its bus local portal (1802–1808). The bus local portal (1802–1802) forwards this message to the next portal (next neighbor as described in reference to FIG. 7). The next neighbor then passes the message to its next neighbor. The message passing continues from one portal to the next until the message returns to its initial portal, where it is removed. Thus, if prime portal 1802 receives a broadcast from one of its nodes (1816, 1818), the broadcast message is passed to its next neighbor, portal 1804. Portal 1804 then broadcasts the message to portal 1808, which broadcasts the message to portal 1806, which broadcasts the message to portal 1802. Once portal 1802 receives its own broadcast message, the message is removed and dropped.

Each broadcast message generates a broadcast write transaction when it enters a bus through the dominant portal, ensuring one and only one broadcast on each bus. The broadcast messages are implemented as a sequence of directed-write transactions, in which each transaction may be flow controlled. Thus, the broadcast messages are flow controlled and need not be discarded on congested bridges. In addition, the completion of a broadcast message is confirmed when it returns to the initiating portal, and broadcast messages may be used to establish routing paths within the interconnect.

Broadcast messages are designed to be idempotent, so that they may be safely retired once they are returned to the initiating portal. In order to accomplish this, bus bridge portals maintain a copy of the previously received message, discarding the second and following copies after accepting the first. The broadcast message writes are acknowledged, but no response is returned to the sending portal. Because there are no responses that must be distinctly labeled, this allows an identical transaction to be safely and immediately reused after a short acknowledge-missing delay.

To avoid circular dependency deadlocks, one portal in the circular list of portals receives the message in a logical request queue and outputs the message to the next portal on a second logical response queue. Deadlock is avoided by mandating that request queue messages never block the processing of response queue messages.

In one embodiment, a broadcast message may trigger the return of information from multiple nodes. This form of broadcast trigger/collection is referred to as "broadcall" in the backplane environment. Within the interconnect, a broadcall protocol that returns selected node addresses is referred to as address resolution protocol (ARP). In one embodiment, the information received from multiple nodes may be triggered by supplying the EUI of the portal or node as the broadcast message is passed along. Thus, information is appended to the broadcast message as it passes through each portal and finally returns to the initiating portal. As the information passes through each portal, the information may be maintained in tables within the portal for later use.

Figure 16:
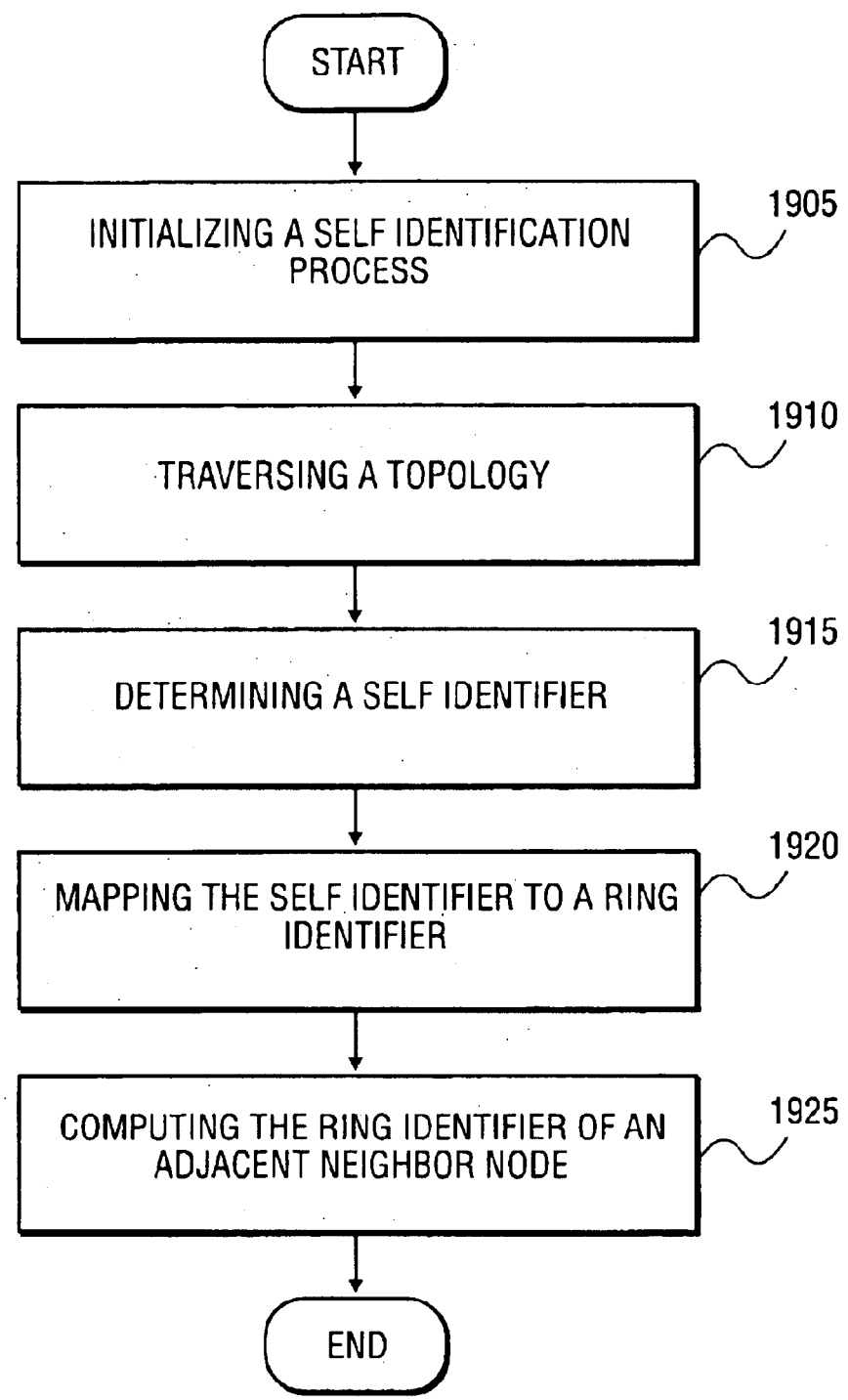
FIG. 16 is a flow diagram of one embodiment for ordering a topology of nodes to form a ring structure.

FIG. 16 is a flow diagram of one embodiment for ordering a topology of nodes to form a ring structure. Initially, at processing block 1905, a self identification process is initialized. The self identification process may be initialized by any node within the topology. Each node sends a self identification grant (selfID grant) to all nodes, beginning with a connected node with the lowest numbered identification. The connected node numbering is based upon the port numbers defined during bus initialization.

At processing block 1910, the topology is traversed by conceptually routing message packets (ringID packets) to at least one physical port of each of the nodes in the topology. Each node sends users its ringID to communicate with its topologically adjacent node.

At processing block 1915, each node determines the ringID of its topologically adjacent neighbor. Each node begins with its own ringID equal to zero on its own port 1022 output. Each node monitors ringID packet transmissions and keeps track of its own ringID.

At processing block 1920, a node the self identifier (selfID) is mapped in order to arrive at a phyID to ringID mapping. Each node is defined by a relative ring identification (ringID) value made up of the bus identification (busID) and physical identification (phyID) portions.

At processing block 1925, each node saves the phyID of its topologically adjacent neighbor node (with the next larger ringID). Each node saves only its own ringID and the ringID of its adjacent neighbor. Thus, each node knows its topologically adjacent neighbor and is able to forward any packets or messages from itself to its next neighbor within the topology.

Figure 17:
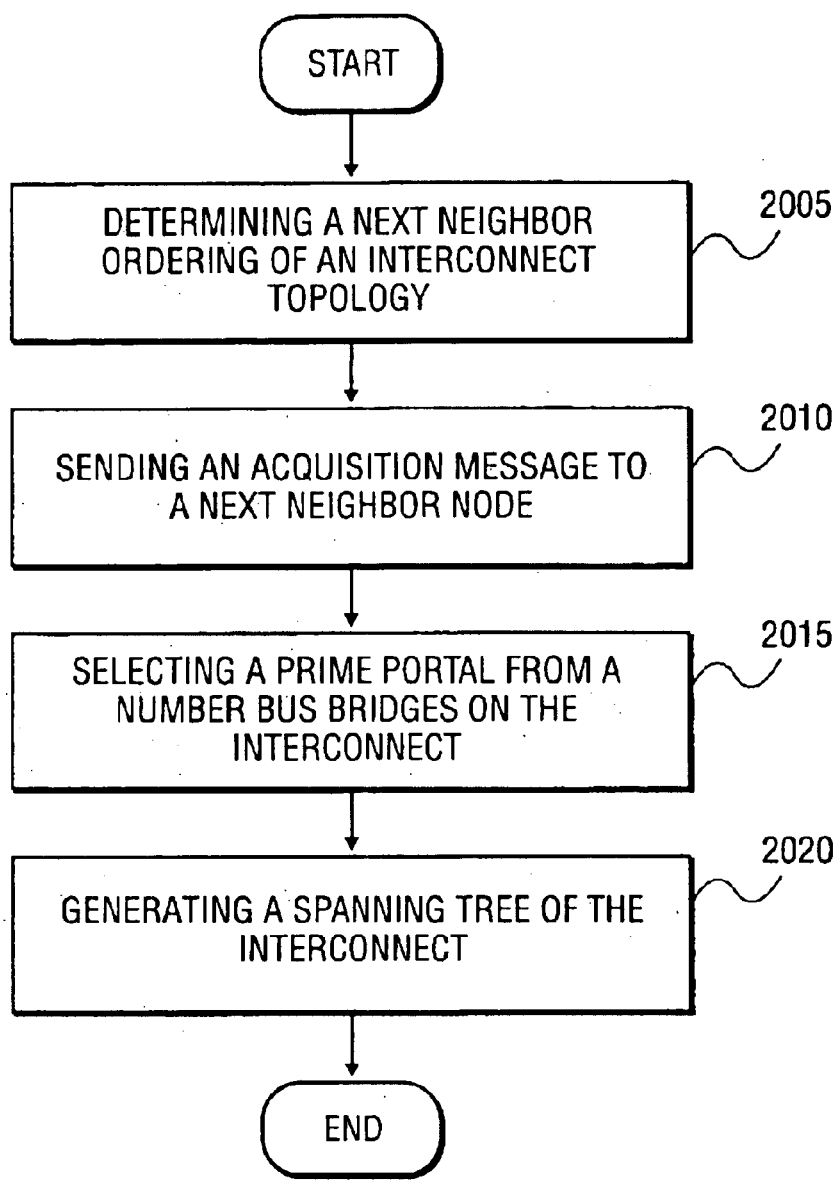
FIG. 17 is a flow diagram of one embodiment for refreshing an interconnect topology.

FIG. 17 is a flow diagram of one embodiment for refreshing an interconnect topology. In this embodiment, the interconnect topology comprises a number of nodes and a number of bus bridges. Initially at processing block 2005, a next neighbor ordering of the interconnect topology is determined as described in reference to FIG. 16.

At processing block 2010, an acquisition message is sent from a node to its next neighbor node. In one embodiment, each node sends the acquisition message to its next neighbor and these messages initially contain a prime portal selection identifier (refreshID). In addition, in one embodiment, the prime portal selection identifier contains a bus count and a portal count. The portal count value in the acquisition message is incremented when passing through each bus bridge.

At processing block 2015, a prime portal is selected from a number of bus bridges on the interconnect. Each bus bridge monitors the refreshID. If the refreshID of the current bus bridge is larger than the incoming refreshID, then the bus bridge overrides the refreshID with its own refreshID. The current bridge passes the new refreshID to its own next neighbor. After the refreshID is passed throughout the topology, the bus bridge with the largest refreshID is selected as the prime portal.

At processing block 2020, a spanning tree of the interconnect is generated. The spanning tree is generated by circumscribing a path from the prime portal through the bus bridges in a daisy-chain manner from next neighbor to next neighbor.

Figure 18:
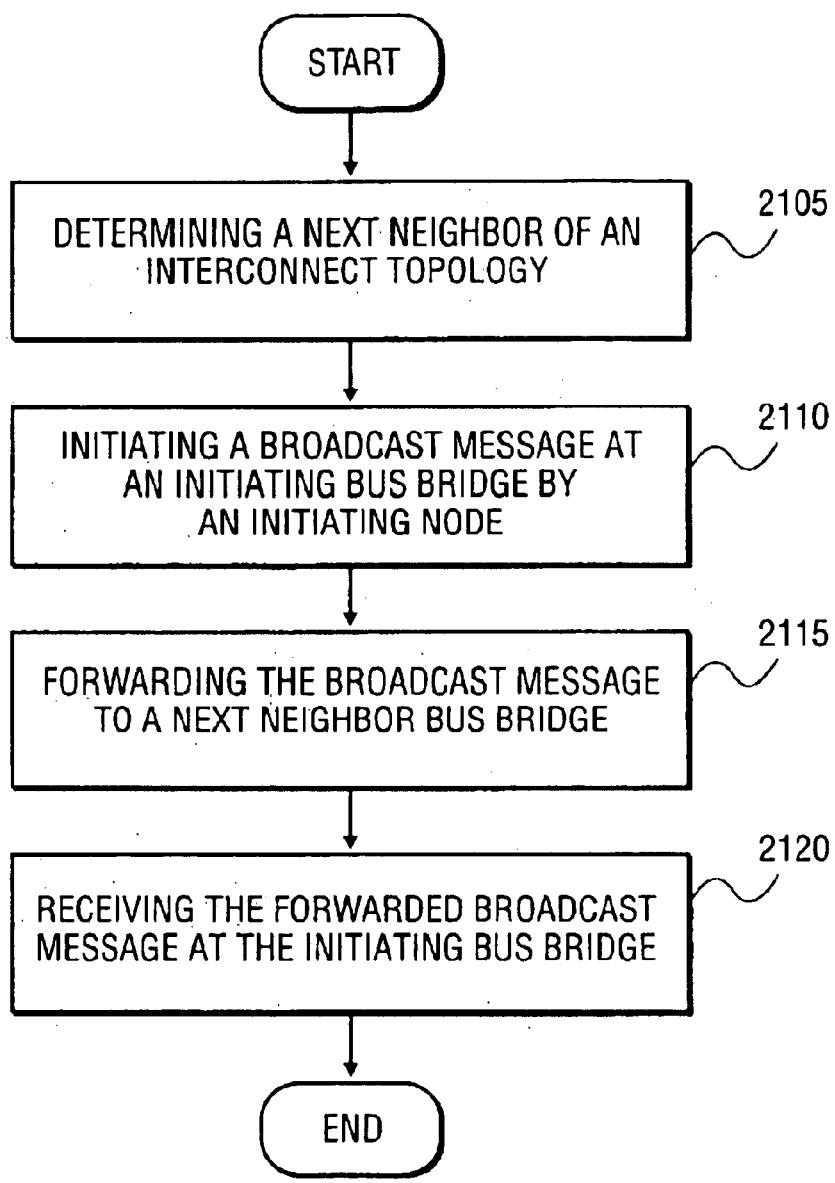
FIG. 18 is a flow diagram of one embodiment for message broadcast flow control on a bus bridge interconnect.

FIG. 18 is a flow diagram of one embodiment for message broadcast flow control on a bus bridge interconnect. Initially at processing block 2105, a next neighbor bus bridge topology is determined as described in reference to FIG. 16.

At processing block 2110, a broadcast message is initiated by an initiating node at an initiating bus bridge. In one embodiment, the broadcast message is initiated by the initiating node sending the broadcast message to its own local bus bridge. Each broadcast message generates a broadcast write transaction when it enters a bus through its own bus bridge. This ensures that only one broadcast message is on each bus at a given time. The broadcast messages are implemented as a sequence of directed write transactions in which each transaction may be flow controlled. Thus, the broadcast messages are flow controlled and need not be discarded on congested bridges.

At processing block 2115, the broadcast message is forwarded to a next neighbor bus bridge. Next neighbor processing is described in reference to FIG. 7. The next neighbor bus bridge then passes the broadcast message to its own next neighbor. The message passage continues from one bus bridge to the next until the message returns to its initial bus bridge. In one embodiment, each bus bridge maintains a copy of the received broadcast message and discards a second or subsequent copy of the broadcast message as each is received. All but one bus bridge that receives the broadcast message into a logical request queue sends that message to its adjacent neighbor's request queue; similarly, messages received in the response queue are sent to the adjacent neighbor's response queue. One of the bus bridges takes its received request messages and sends them to the adjacent neighbor's response queue; similarly, messages received in the response queue are discarded. This ensures that the broadcast messages pass through all portals, in a non-deadlocking fashion, before being discarded.

At processing block 2120, the forwarded broadcast message is received back at the initiating bus bridge. In one embodiment, once the initiating bus bridge receives the broadcast message, the message is removed from the system.

In an alternate embodiment, as the broadcast message is received at each bus bridge, each bus bridge appends its own extended unique identifier (EUI) to the broadcast message. The broadcast message is transferred, with the appended EUI, to the next neighbor and finally returns to the initiating bus bridge. Once the appended broadcast message is received at the initiating bus bridge, the initiating bus bridge saves the EUI information of all of the interconnect portals.

Figure 19:
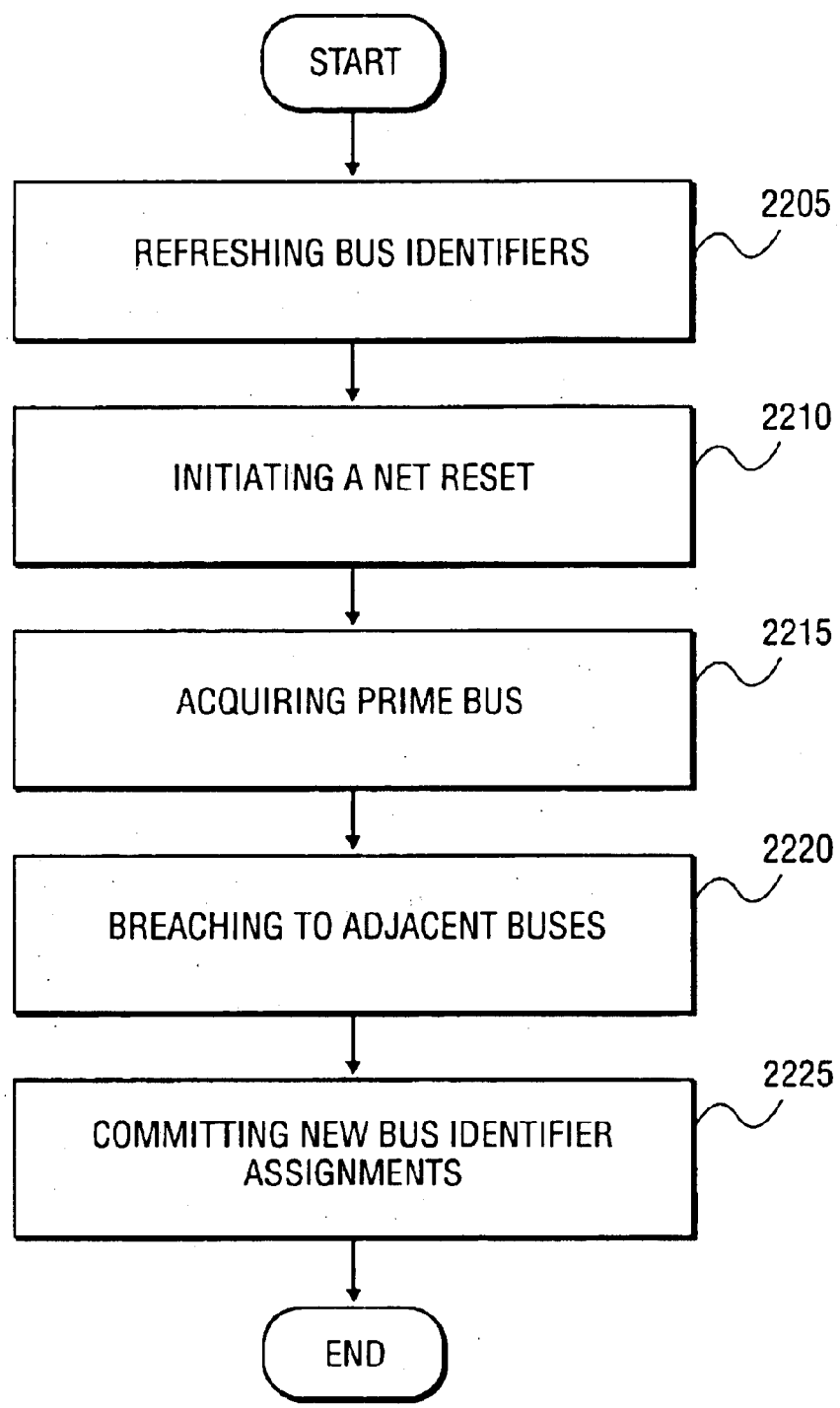
FIG. 19 is a flow diagram of one embodiment for a multi-phase net reset on a bus bridge interconnect

FIG. 19 is a flow diagram of one embodiment for a multi-phase net reset on a bus bridge interconnect. Initially, at processing block 2205, bus bridge identifiers are refreshed, as described in reference to FIG. 18.

At processing block 2210, a net reset is initiated. The net reset may be initiated by removing a node or subnet of the interconnect or adding a node or subnet to the interconnect.

At processing block 2215, a primary bus is acquired. In one embodiment, the primary bus may be the bus on which the rest is initiated. A bus bridge initially sends a reset acquire message to its next neighbor bus bridge. Next neighbor topologies are described in reference to FIG. 7. The first of these messages is sent from the prime portal and circulates through secondary portals on the primary bus. As each bus bridges receives the acquire message, it determines whether it is a candidate for being the prime portal. In one embodiment, the best prime portal candidate is determined by the highest EUI on the primary bus. After the acquire messages are circulated through the topology, the prime portal is determined. The acquisition of the primary bus completes when the acquire message of the candidate (initiating bus bridge) returns to the portal with the highest EUI.

At processing block 2220, adjacent buses are breached. After the primary bus has been acquired, the prime portal transmits a breach message to its next neighbor. The receipt of the breach message by the receiving portal causes the portal to breach onto an adjacent bus. The breach commands trigger sequential acquisitions of each adjacent bus. The reset breach message initiated by the initiating bus bridge causes the acquisition of the first remote bus. The prime portal acquires all buses adjacent to itself by sending breach messages to each of the attached bus bridges. The next portal on the adjacent bus observes the returning reset acquire indication and propagates a reset breach indication to its adjacent bus. That reset circulates and acquires the subsequent buses.

The breach messages eventually circulate through all remote buses. The breach messages establish tentative busID assignments and routes. However, these tentative assignments are not activated until the commit phase, as discussed below. During remote bus acquisition, the breach packets avoid previously acquired buses. As in the acquiring of the primary bus, all bus acquisitions complete when the breach message returns to the initiating bus bridge portal. After the breach is completed, the addresses that may be reclaimed, which addresses are free, and how many nodes are trying to claim free addresses are all known.

At processing block 2225, the commit phase of new bus identifier assignments is performed. Breach packets return bridge routing tables to the prime portal. During the commit phase, the bridge routing tables are updated and the busID assignments are finalized. The commit phase changes the bus bridge paths and opens closed bridges. During the commit phase, all portals receive assignments and routing information. Commit packets are sent initiating the prime portal and traverse the interconnect topology. The commit completes when the commit packets return to the prime portal. Normal operation of the net is possible at this time, as the sending of the commit messages stops and the bridges become operational.

Figure 20:
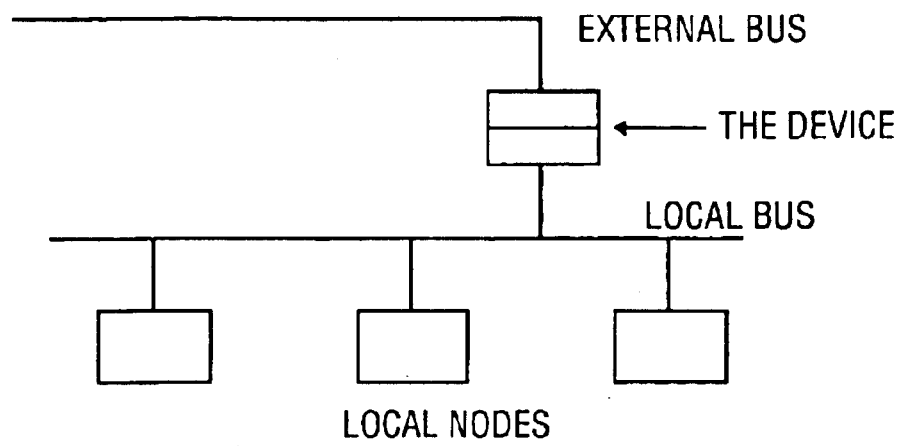
FIG. 20 is one embodiment of a device that is a proxy for multiple local nodes to isolate local traffic from an external bus by filtering an asynchronous packet using the packet's physical identification, connected to a local bus and an external bus.

In one embodiment, a device that is a proxy for multiple local nodes to isolate local traffic from an external bus by filtering an asynchronous packet using the packet's physical identification is connected to a local bus and an external bus, as shown in FIG. 20. The external bus is a serial bus (IEEE 1394). The local bus is not necessarily a serial bus. The local bus needs to be initialized first before the device participate the initialization of the external bus. (Later, in this document, I discuss a method to re-initialize the local bus).

Figure 21:
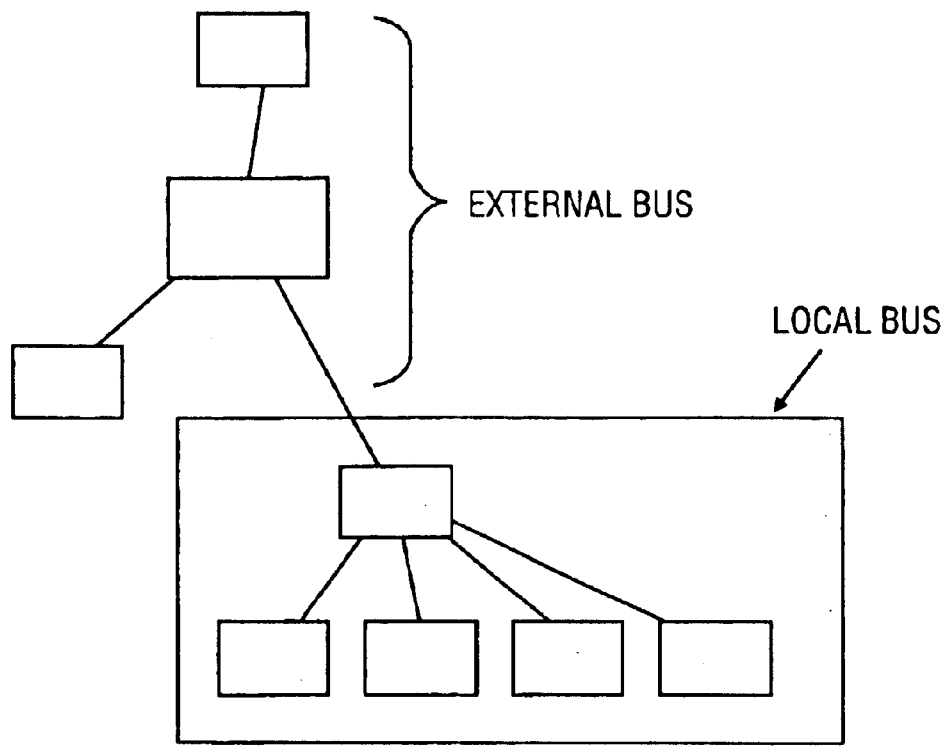
FIG. 21 is one embodiment of a self ID phase of the external bus and the device.

The device know the number of devices (N) on the local bus (including itself). In the self ID phase of the external bus, the device works as a proxy of the device's local bus by generating self ID packets for all local nodes and itself. This way the device represent itself and devices on the local bus as a sub-tree of the network, as shown in FIG. 21.

Once the external bus is configured to include a subtree of the local nodes, the device forward packets as follows: For an asynchronous request packet on the external bus redirected to the local nodes, the device receives it and responds with an ack pending. Once the packet is forwarded to the local node and the local node acknowledges the packet, the device sends a response packet to the external bus. For an asynchronous response packet on the external bus directed to the local node, the device responds with ack complete and forwards the packet to the local node. For a request packet going out to the external bus, the device sends it for the local bus. If it is finished with ack complete/to ack busy/to ack data error/to ack address error, then the device sends a corresponding response packet to the local node. For an outgoing response packet, the device forwards it to the external bus. For a local bus internal asynchronous packet, the device does not forward it to the external bus.

Traffic isolation for isochronous packets is also possible, if the device knows the channel number used for internal traffic; and the channel number used on the external bus which need to be received in the local bus.

The advantage of this embodiment is that the devices "appear" to software as though on one bus. Thus, new software to handle bus bridges is unnecessary.

The specific arrangements and methods herein are merely illustrative of the principles of this invention. Numerous modifications in form and detail may be made by those skilled in the art without departing from the true spirit and scope of the invention.

What is claimed is:

1. A method for a multi-phase net refresh on a bus bridge interconnect, the interconnect comprising a plurality of nodes and a plurality of buses, the method comprising:

acquiring a primary bus by communicating with bus bridges on the plurality of buses;

breaching to at least one secondary bus of the plurality of buses to acquire the secondary bus; and committing the primary bus and the secondary bus.

2. The method of claim 1 wherein acquiring further comprises:

assigning bus identifiers; and collecting the bus identifiers.

3. The method of claim 1 wherein committing further comprises:

resolving bus assignment conflicts; and assigning bus identifiers.

4. The method of claim 1 further comprising:

refreshing bus identifiers by determining an adjacent neighbor bus bridge topology.

5. The method of claim 4 wherein determining an adjacent neighbor comprises:

determining a self identifier for each of the plurality of nodes;

mapping the self identifier to a ring identifier for each of the plurality of nodes; and saving the ring identifier of at least one adjacent neighbor node.

6. The method of claim 1 further comprising:

initiating a net reset.

7. The method of claim 6 wherein initiating a net reset comprises removing a subnet or adding a node.

8. The method of claim 1 wherein acquiring the primary bus further comprises:

sending a reset acquire message from the an initiating bus bridge to its adjacent neighbor bus bridge; and selecting a prime portal from bus bridges connected to the primary bus.

9. The method of claim 8 wherein selecting a prime portal comprises:

monitoring an incoming prime portal selection identifier by each bus bridge on the primary bus;

overriding the incoming prime portal selection identifier with a prime portal selection identifier of a first bus bridge if the prime portal selection identifier of the first bus bridge is larger than the incoming prime portal selection identifier; and selecting the bus bridge with a largest prime portal selection identifier as the prime portal.

10. The method of claim 8 wherein each bus bridge on the primary bus transfers the reset acquire message to its own adjacent neighbor bus bridge.

11. The method of claim 8 wherein acquiring completes when the reset acquire message returns to the initiating bus bridge.

12. The method of claim 1 further comprising:

generating a spanning tree of the primary bus by circumscribing a path through at least one bus bridge connected to the primary bus.

13. The method of claim 1 wherein breaching further comprises:

transmitting a breach message from a prime portal to an adjacent neighbor bus bridge of the prime portal; and acquiring the at least one secondary bus by the adjacent neighbor bus bridge.

14. The method of claim 13 iteratively performing transmitting and acquiring for each bus of the plurality of busses.

15. The method of claim 13 wherein acquiring avoids previously acquired busses.

16. The method of claim 13 further comprising:

completing secondary bus acquisition upon receipt of an acquire bus message by an initiating breach bus bridge.

17. The method of claim 1 wherein committing further comprises:

returning remote bridge routing tables to an initiating bus bridge;

updating bridge routing tables on a prime portal with the remote bridge routing tables; and finalizing bus identifier assignments.

18. The method of claim 1 wherein committing further comprises:

sending commit packets from a prime portal to its adjacent neighbor;

traversing a topology of the interconnect with the commit packets; and receiving the commit packets back by the prime portal.

19. The method of claim 1 wherein committing further comprises:

opening closed bus bridges; and commencing interconnect bus traffic.

20. The method of claim 1 wherein at least one bus of the plurality of buses conforms substantially to IEEE 1394 standard.

21. A system for a multi-phase net refresh on a bus bridge interconnect, the interconnect comprising a plurality of nodes and a plurality of buses, the system comprising:

means for acquiring a primary bus by communicating with bus bridges on the plurality of buses;

means for breaching to at least one secondary bus of the plurality of buses to acquire the secondary bus; and means for committing the primary bus and the secondary bus.

22. A computer-readable medium comprising program instructions for performing a multi-phase net refresh comprising:

acquiring a primary bus by communicating with bus bridges on a plurality of buses;

breaching to at least one secondary bus of the plurality of buses to acquire the secondary bus; and committing the primary bus and the secondary bus.

23. A system for a multi-phase net refresh on a bus bridge interconnect, the system comprising:

a primary bus;

at least one secondary bus;

at least one bus bridge connected to the primary bus and the secondary bus;

a primary node to acquire the primary bus by communicating with the at least one bus bridge, breach to the at least one secondary bus to acquire the secondary bus, and commit the primary bus and the secondary bus.

24. The system of claim 23 wherein the primary node further assigns bus identifiers, and collects the bus identifiers.

25. The system of claim 23 wherein the primary node further resolves bus assignment conflicts, and assigns bus identifiers.

26. The system of claim 23 wherein the primary node further refreshes bus identifiers by determining an adjacent neighbor bus bridge topology.

27. The system of claim 26 wherein the primary node further determines a self identifier for each of a plurality of nodes, maps the self identifier to a ring identifier for each of the plurality of nodes, and saves the ring identifier of an adjacent neighbor node.

28. The system of claim 23 wherein the primary node initiates a net reset.

29. The system of claim 28 wherein the primary node removes a subnet or adds a subnet.

30. The system of claim 23 wherein the at least one bus bridge is one of a plurality of bus bridges and the primary bus further sends a reset acquire message from an initiating bus bridge to an adjacent neighbor bus bridge.

31. The system of claim 30 further comprising:

a prime portal selected from bus bridges connected to the primary bus.

32. The system of claim 30 wherein the primary node further monitors an incoming prime portal selection identifier, overrides the incoming prime portal selection identifier with a prime portal selection identifier of a first bus bridge if the prime portal selection identifier of the first bus bridge is larger than the incoming prime portal selection identifier.

33. The system of claim 32 further comprising:

a prime portal, selected from the bus bridges, the prime portal having a largest prime portal selection identifier.

34. The system of claim 30 wherein each bus bridge transfers the reset acquire message to its own adjacent neighbor bus bridge.

35. The system of claim 30 wherein the primary node completes acquiring when the reset acquire message returns to the initiating bus bridge.

36. The system of claim 23 wherein the primary node further generates a spanning tree of the primary bus by circumscribing a path through the at least one bus bridge.

37. The system of claim 23 further comprising:

an initiating bus bridge to transmit a breach message from a prime portal to an adjacent neighbor bus bridge of the prime portal, and acquire the at least one secondary bus by the adjacent neighbor bus bridge.

38. The system of claim 37 wherein the initiating bus bridge avoids previously acquired busses.

39. The system of claim 37 wherein the initiating bus bridge further completes secondary bus acquisition upon receipt of an acquire bus message.

40. The system of claim 23 further comprising:
- an initiating bus bridge to receive remote bridge routing tables;
- a prime portal to update its bridge routing tables with the remote bridge routing tables, and finalize bus identifier assignments.

41. The system of claim 23 wherein further comprising:
- a prime portal to send commit packets to an adjacent neighbor node, traverse a bus interconnect topology with the commit packets, and receive the commit packets back.

42. The system of claim 23 wherein the at least one bus bridges is one of a plurality of bus bridges and the primary node further opens closed bus bridges, and commences interconnect bus traffic.

43. The system of claim 23 wherein at least one bus conforms substantially to IEEE 1394 standard.

* * * * *